(12) United States Patent
Banno et al.

(10) Patent No.: US 8,995,152 B2
(45) Date of Patent: Mar. 31, 2015

(54) INVERTER CIRCUIT

(75) Inventors: Seitaro Banno, Hachioji (JP); Satoru Fujita, Akishima (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 170 days.

(21) Appl. No.: 13/879,388

(22) PCT Filed: May 23, 2012

(86) PCT No.: PCT/JP2012/003354
§ 371 (c)(1),
(2), (4) Date: Jun. 5, 2013

(87) PCT Pub. No.: WO2013/157051
PCT Pub. Date: Oct. 24, 2013

(65) Prior Publication Data
US 2014/0204642 A1 Jul. 24, 2014

(30) Foreign Application Priority Data
Apr. 19, 2012 (JP) ................. 2012-095769

(51) Int. Cl.
| H02M 3/335 | (2006.01) |
| H02M 1/36 | (2007.01) |
| H02M 7/483 | (2007.01) |
| H02M 5/27 | (2006.01) |
| H02M 7/487 | (2007.01) |

(52) U.S. Cl.
CPC ............ *H02M 7/483* (2013.01); *H02M 5/27* (2013.01); *H02M 7/487* (2013.01)
USPC .............................................. 363/37; 363/49

(58) Field of Classification Search
CPC .......... H02M 1/36; H02M 5/27; H02M 5/44; H02M 5/458; H02M 7/483; H02M 7/487; H02M 2001/0083; H02M 2001/009; H02M 2001/0093

USPC ............ 363/20, 21.01, 24, 25, 37, 49, 63, 74, 363/78, 95, 98, 131, 132, 133; 307/43, 44, 307/71

See application file for complete search history.

(56) References Cited

U.S. PATENT DOCUMENTS

| 7,391,132 B2* | 6/2008 | Chen ................................. 363/37 |
| 2003/0227785 A1* | 12/2003 | Johnson, Jr. ..................... 363/37 |
| 2013/0301314 A1* | 11/2013 | Fu et al. ........................... 363/37 |

FOREIGN PATENT DOCUMENTS

| JP | 10-075581 A | 3/1998 |
| JP | 10-295084 A | 11/1998 |
| JP | 2000-050529 A | 2/2000 |
| WO | 2012-067167 A1 | 5/2012 |

* cited by examiner

*Primary Examiner* — Matthew Nguyen
*Assistant Examiner* — Jye-June Lee
(74) *Attorney, Agent, or Firm* — Rabin & Berdo, P.C.

(57) ABSTRACT

An inverter circuit 40 with reduced loss in semiconductor elements when starting up, having switching elements Q1 and Q2 in series, and connected to both ends of a direct current power source circuit 30 having direct current power sources Psp and Psn in series, and including an alternating current output terminal U connected to a connection point of the switching elements, an alternating current output terminal V connected to a connection point of the direct current power sources, a bidirectional switch element S1, connected between the alternating current output terminal U and a terminal R of an alternating current power source 1, and a bidirectional switch element S2, connected between the alternating current output terminal U and a terminal S of the alternating current power source, causing the bidirectional switch elements to turn on and off when starting up.

20 Claims, 19 Drawing Sheets

FIG. 4

| ALTERNATING CURRENT VOLTAGE COMMAND (Vu*) | ALTERNATING CURRENT POWER SOURCE VOLTAGE (Vr) | COMPARISON OF Vr AND Vu* | δ (RANGE) | α (PULSE WIDTH COMMAND) | ELEMENT SELECTION H-ARM | ELEMENT SELECTION L-ARM | OFF-STATE ARMS |
|---|---|---|---|---|---|---|---|
| Vu* ≧ 0 | Vr < 0 | — | 1 | Vu* / Vp | Q1 | S2 | Q2, S1 |
| Vu* ≧ 0 | Vr ≧ 0 | Vu* > Vr | 2 | (Vu*−Vr) / (Vp−Vr) | Q1 | S1 | Q2, S2 |
| Vu* ≧ 0 | Vr ≧ 0 | Vu* ≦ Vr | 3 | Vu* / Vr | S1 | S2 | Q1, Q2 |
| Vu* < 0 | Vr < 0 | Vu* ≧ Vr | 4 | Vu* / Vr | S1 | S2 | Q1, Q2 |
| Vu* < 0 | Vr < 0 | Vu* < Vr | 5 | (Vu*−Vr) / (Vn−Vr) | Q2 | S1 | Q1, S2 |
| Vu* < 0 | Vr ≧ 0 | — | 6 | Vu* / Vn | Q2 | S2 | Q1, S1 |

FIG. 11

| ALTERNATING CURRENT VOLTAGE COMMAND (Vu*) | ALTERNATING CURRENT POWER SOURCE VOLTAGE (Vr) | COMPARISON OF Vr AND Vu* | δ (RANGE) | α (PULSE WIDTH COMMAND) | ELEMENT SELECTION | | |
|---|---|---|---|---|---|---|---|
| | | | | | H-ARM | L-ARM | OFF-STATE ARMS |
| Vu* ≥ 0 | Vr < 0 | — | 1 | Vu* / Vp | Q1 | S2 | Q2, S1 |
| Vu* ≥ 0 | Vr ≥ 0 | Vu* > Vr | 2 | (Vu*−Vr) / (Vp−Vr) | Q1 | S1 | Q2, S2 |
| Vu* ≥ 0 | Vr ≥ 0 | Vu* ≤ Vr | 3 | Vu* / Vr | S1 | S2 | Q1, Q2 |
| Vu* < 0 | Vr < 0 | Vu* ≥ Vr | 4 | Vu* / Vr | S1 | S2 | Q1, Q2 |
| Vu* < 0 | Vr < 0 | Vu* < Vr | 5 | (Vu*−Vr) / (Vn−Vr) | Q2 | S1 | Q1, S2 |
| Vu* < 0 | Vr ≥ 0 | — | 6 | Vu* / Vn | Q2 | S2 | Q1, S1 |
| |Vu*−Vr| < ΔVu* | | | 7 | 1.0 (100%) | S1 | — | Q1, Q2, S2 |

US 8,995,152 B2

INVERTER CIRCUIT

CROSS-REFERENCE TO RELATED APPLICATIONS

This application claims priority from Japanese application serial number 2012-095769, filed on Apr. 19, 2012.

TECHNICAL FIELD

The present invention relates to an inverter circuit wherein a predetermined alternating current voltage is generated using four levels of voltage obtained from voltage of an alternating current power source and voltage of a direct current power source. More specifically, the invention relates to an operation generating output voltage when the inverter circuit starts up.

BACKGROUND ART

FIG. 18 is a diagram for illustrating an inverter circuit disclosed in JP-A-10-075581. The inverter circuit generates a predetermined alternating current voltage using the voltage of an alternating current power source and a direct current power source voltage obtained by temporarily converting the voltage of the alternating current power source into direct current voltage.

In the diagram, 1 is a single phase alternating current power source, 2 is a capacitor, 3 is a converter circuit, 4 is an inverter circuit, 5 is a filter circuit, and 6 is a load.

The single phase alternating current power source 1 has a terminal R and a terminal S, wherein an alternating current voltage is output between the terminal R and terminal S. The capacitor 2 is connected between the terminal R and terminal S of the single phase alternating current power source 1.

The converter circuit 3 has as main components a series circuit of capacitors Cp and Cn, a series circuit of switching elements Qp and Qn, and a reactor L. The series circuit of the capacitors Cp and Cn is connected between a positive side direct current terminal P and negative side direct current terminal N of the converter circuit 3. Also, a series connection point of the capacitors Cp and Cn is connected to a neutral terminal O of the converter circuit 3, and is connected to the terminal S of the single phase alternating current power source 1. The series circuit of the switching elements Qp and Qn is connected in parallel to the series circuit of the capacitors Cp and Cn. The reactor L is connected between the terminal R of the single phase alternating current power source 1 and a series connection point of the switching elements Qp and Qn.

The inverter circuit 4 has as main components a series circuit of switching elements Q1 and Q2 and a bidirectional switch element S1. The series circuit of the switching elements Q1 and Q2 is connected between the terminal P and terminal N of the converter circuit 3. A series connection point of the switching elements Q1 and Q2 is connected to an alternating current output terminal U of the inverter circuit 4. An alternating current output terminal V of the inverter circuit 4 is connected to the neutral terminal O of the converter circuit 3. The bidirectional switch element S1 is connected between the alternating current output terminal U of the inverter circuit 4 and the terminal R of the single phase alternating current power source 1.

The alternating current output terminals U and V of the inverter circuit 4 are connected to the filter circuit 5. The filter circuit 5 is a circuit wherein a reactor Lf1 and a capacitor Cf1 are connected in series. The load 6 is connected to both ends of the capacitor Cf1.

The heretofore described configuration is such that the converter circuit 3 causes the switching elements Qp and Qn to turn on and off alternately, thereby charging the capacitors Cp and Cn to a predetermined voltage. The value of the voltage with which the capacitors Cp and Cn are charged is higher than the amplitude value of the voltage of the single phase alternating current power source 1.

The inverter circuit 4 is such that an operation whereby any two elements of the switching elements Q1 and Q2 and bidirectional switch element S1 are turned on and off is carried out, thereby outputting an alternating current voltage having a predetermined fundamental wave element between the alternating current output terminals U and V.

The voltage output between the alternating current output terminals U and V is applied to the load 6 after a high frequency element is eliminated in the filter circuit 5.

Further, when a voltage higher than the voltage of the single phase alternating current power source 1 is output, the inverter circuit 4 is such that, when the voltage of the single phase alternating current power source 1 is of a positive half-cycle, the switching element Q1 and bidirectional switch element S1 are alternately turned on and off. At this time, the switching element Q2 is in an off-state. Meanwhile, when the voltage of the single phase alternating current power source 1 is of a negative half-cycle, the inverter circuit 4 is such that the switching element Q2 and bidirectional switch element S1 are alternately turned on and off. At this time, the switching element Q1 is in an off-state.

Also, when a voltage lower than the voltage of the single phase alternating current power source 1 is output, the inverter circuit 4 is such that, when the voltage of the single phase alternating current power source 1 is of a positive half-cycle, the switching element Q2 and bidirectional switch element S1 are alternately turned on and off. At this time, the switching element Q1 is in an off-state. Meanwhile, when the voltage of the single phase alternating current power source 1 is of a negative half-cycle, the inverter circuit 4 is such that the switching element Q1 and bidirectional switch element S1 are alternately turned on and off. At this time, the switching element Q2 is in an off-state.

SUMMARY OF INVENTION

Technical Problem

The inverter circuit 4 shown in FIG. 18 is such that, when a voltage higher than the voltage of the single phase alternating current power source 1 is output, a voltage equivalent to the difference between the voltage of the capacitor Cp or capacitor Cn and the voltage of the single phase alternating current power source 1 is applied to the switching elements Q1 and Q2 and bidirectional switch element S1. However, when a voltage lower than the voltage of the single phase alternating current power source 1 is output, a voltage that is the voltage of the single phase alternating current power source 1 added to the voltage of the capacitor Cp or capacitor Cn is applied to the switching elements Q1 and Q2 and bidirectional switch element S1.

Specifically, the inverter circuit 4 carries out a soft start operation whereby the output voltage is raised from zero to the voltage of the single phase alternating current power source 1 when starting up. At this time, the inverter circuit 4 outputs a voltage lower than the voltage of the single phase alternating current power source 1. When the voltage of the single phase alternating current power source 1 is of a positive half-cycle when starting up, a voltage that is the voltage of the single phase alternating current power source 1 added to the voltage of the capacitor Cp is applied to the switching element Q2 and bidirectional switch element S1. Also, when the voltage of the single phase alternating current power source 1 is of a negative half-cycle, a voltage that is the voltage of the single phase alternating current power source 1 added to the voltage of the capacitor Cn is applied to the switching element Q1 and bidirectional switch element S1.

That is, when the inverter circuit 4 starts up, a voltage higher than the voltage of the single phase alternating current power source 1 is applied to the switching elements Q1 and Q2 and bidirectional switch element S1. Because of this, there is a problem in that a large switching loss occurs in the inverter circuit 4 due to an operation of turning on and turning off the switching elements Q1 and Q2 and bidirectional switch element S1.

Also, the inverter circuit 4 shown in FIG. 18 is such that, when a voltage higher than the voltage of the single phase alternating current power source 1 is output, the amount of variation of the voltage output between the alternating current output terminals U and V is equivalent to the difference between the voltage of the capacitor Cp or capacitor Cn and the voltage of the single phase alternating current power source 1. Meanwhile, when a voltage lower than the voltage of the single phase alternating current power source 1 is output, the amount of variation of the voltage output between the alternating current output terminals U and V is equivalent to a voltage that is the voltage of the single phase alternating current power source 1 added to the voltage of the capacitor Cp or capacitor Cn.

Consequently, there is a problem in that, in order to reduce ripple current flowing through the filter circuit 5 when the inverter circuit 4 starts up, it is necessary to increase the size of the reactor Lf1.

The invention has been contrived in order to solve these kinds of problems with the heretofore known technology. That is, an object of the invention is to provide an inverter circuit such that it is possible to reduce switching loss when starting up. Also, an object of the invention is to provide an inverter circuit such that it is possible to reduce ripple current flowing through a load or filter circuit when starting up.

Solution to Problem

A first aspect of the invention for achieving the heretofore described objects is an inverter circuit characterized by having a series connection point of a first direct current power source and second direct current power source as a neutral terminal, and having as input four levels of voltage, those being a null voltage having the potential of the neutral terminal as a reference, positive voltage of the first direct current power source, negative voltage of the second direct current power source, and the voltage of a single phase alternating current power source of which one end is connected to the neutral terminal, wherein a predetermined alternating current voltage is output between a first alternating current output terminal and a second alternating current output terminal connected to the neutral terminal. Further, the inverter circuit is characterized by including a steady-state mode wherein, during a steady-state operation supplying a predetermined voltage to a load, first and second voltages selected from among the four levels of voltages are output in a complementary way to the first alternating current output terminal in each of control periods synchronous or asynchronous with the cycle of alternating current output voltage. Furthermore, the inverter circuit is characterized by including a start-up mode wherein, during a start-up raising the alternating current output voltage from zero to a predetermined voltage, taking, of the four levels of voltage, the voltage of the alternating current power source as a first voltage and the null voltage as a second voltage, the first and second voltages are output in a complementary way to the first alternating current output terminal in each control period.

A second aspect of the invention is the inverter circuit according to the first aspect, characterized in that the alternating current voltage output between the first alternating current output terminal and second alternating current output terminal in the start-up mode is a voltage synchronous with the voltage of the alternating current power source, and output based on an alternating current voltage command that rises from zero to a predetermined voltage with the passing of time.

A third aspect of the invention is the inverter circuit according to the second aspect, characterized in that the time for which the voltage of the alternating current power source is output in each control period in the start-up mode is a time corresponding to the ratio of the alternating current voltage command with respect to the voltage of the alternating current power source.

A fourth aspect of the invention is the inverter circuit according to the second aspect, characterized in that the average value of the voltages output to the first alternating current output terminal in each control period in the start-up mode is equivalent to the average value of the alternating current voltage command.

A fifth aspect of the invention is the inverter circuit according to any one of the first to fourth aspects, characterized by including a switching element series circuit formed by a positive side switching element connected to a positive side terminal of the first direct current power source and a negative side switching element connected to a negative side terminal of the second direct current power source being connected in series, a series connection point thereof being connected to the first alternating current output terminal, a first bidirectional switch element connected between the first alternating current output terminal and a first terminal of the alternating current power source, and a second bidirectional switch element connected between the first alternating current output terminal and the neutral terminal. Furthermore, the inverter circuit is characterized in that the first and second bidirectional switch elements are turned on and off in a complementary way in each control period of the start-up mode, thereby outputting alternating current voltage between the first alternating current output terminal and second alternating current output terminal.

A sixth aspect of the invention is the inverter circuit according to the fifth aspect, characterized in that after the deviation between the voltage of the alternating current power source and the fundamental wave element of the alternating current output voltage comes within a preset range in the start-up mode, the operation of the inverter circuit shifts from the start-up mode to the steady-state mode.

A seventh aspect of the invention is a three-phase inverter circuit characterized by including two of the inverter circuits according to the sixth aspect, wherein a three-phase alternating current power source and a three-phase load are delta-connected using the two inverter circuits.

An eighth aspect of the invention is a three-phase inverter circuit characterized by including three of the inverter circuits according to the sixth aspect, wherein a three-phase alternating current power source and a three-phase load are Y-connected using the three inverter circuits.

Advantageous Effects of Invention

An inverter circuit to which the invention is applied is such that it is possible to output one level of voltage selected from four levels of voltage, those being a null voltage having the potential of the neutral terminal as a reference, the positive voltage of the first direct current power source, the negative voltage of the second direct current power source, and the voltage of the alternating current power source. Further, the inverter circuit carries out a so-called soft start operation whereby the first and second bidirectional switch elements are turned on and off in a complementary way, and the time for which the first bidirectional switch element is in an on-state is gradually increased, in each control period when starting up.

Owing to this operation, the voltage applied to the first and second bidirectional switch elements when starting up is the voltage of the alternating current power source. Consequently, the inverter circuit to which the invention is applied is such that it is possible to reduce turn-on loss and turn-off loss occurring in the switching elements and bidirectional switch elements when starting up.

Also, the amount of variation in the voltage output between the first and second alternating current output terminals in each control period when starting up is equivalent to the value of the alternating current power source voltage. Consequently, the inverter circuit to which the invention is applied is such that it is possible to reduce ripple current flowing through the load or filter circuit when starting up.

BRIEF DESCRIPTION OF DRAWINGS

FIG. 4 is a diagram for illustrating a relationship between a range determination, and a pulse width command a and element selection.
FIG. 11 is a diagram for illustrating another relationship between a range determination, and the pulse width command α and element selection.

DESCRIPTION OF EMBODIMENTS

Hereafter, using FIG. 1 to FIG. 17, a detailed description will be given of embodiments to which is applied an inverter circuit according to the invention.

Figure 1:
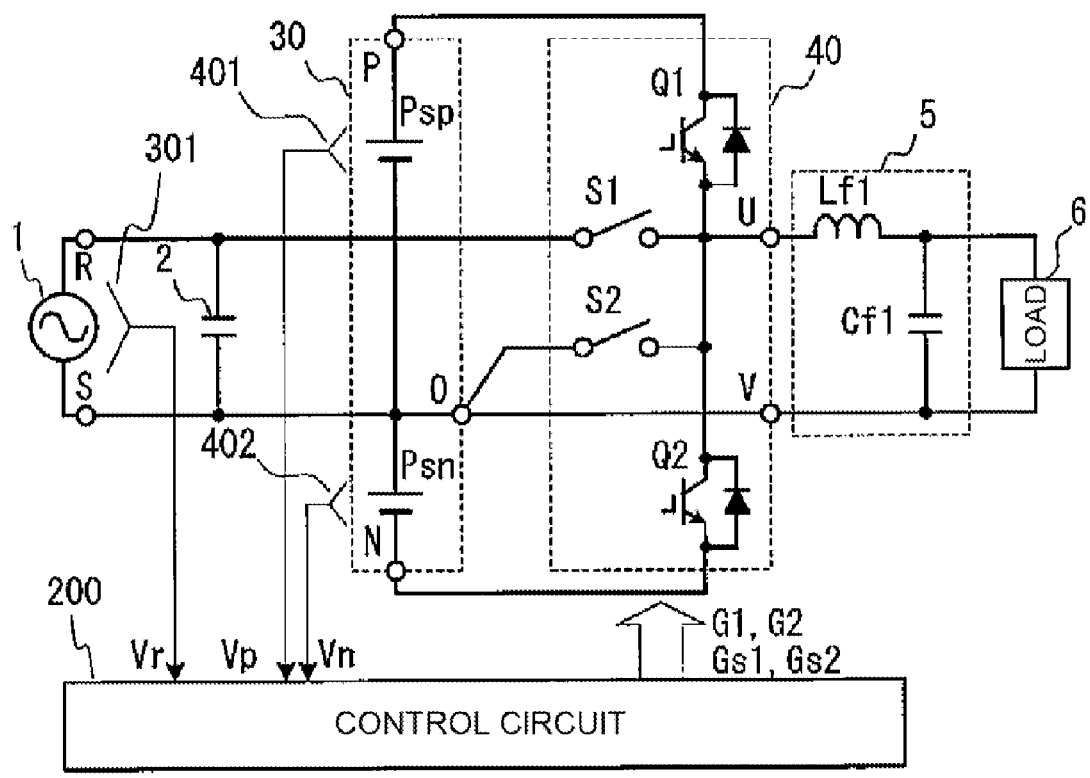
FIG. 1 is a diagram for illustrating a first embodiment of the invention.
Figure 2A:
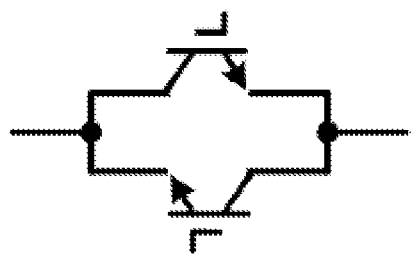
FIG. 2 is diagrams for illustrating embodiments of a bidirectional switch element.
Figure 2B:
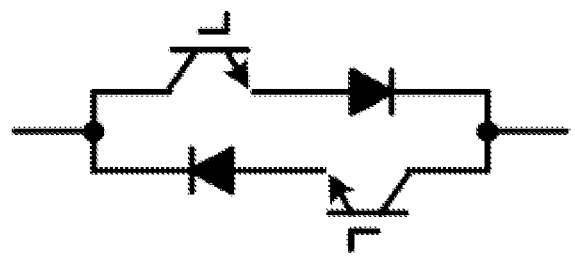
Figure 2C:
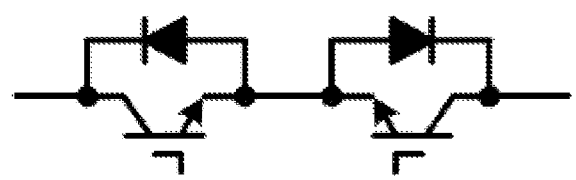
Figure 2D:
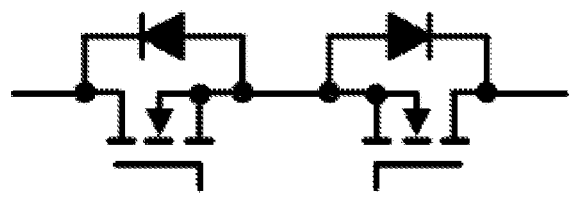

FIG. 1 is a diagram for illustrating a first embodiment of the invention. An inverter circuit according to this embodiment outputs a single phase alternating current voltage using the voltage of a single phase alternating current power source and the voltage of a direct current power source series circuit wherein two direct current power sources are connected in series.

In the diagram, 1 is a single phase alternating current power source, 2 is a capacitor, 30 is a direct current power source series circuit, 40 is an inverter circuit, 5 is a filter circuit, 6 is a load, and 200 is a control circuit. A description of components given the same reference signs as components shown in FIG. 18 will be omitted as appropriate.

The single phase alternating current power source 1 has a terminal R and a terminal S, wherein an alternating current voltage is output between the terminal R and terminal S. The capacitor 2 is connected between the terminal R and terminal S of the single phase alternating current power source 1.

The direct current power source series circuit 30 is a direct current power source circuit formed of a direct current power source Psp and a direct current power source Psn connected in series. The direct current power source Psp is a positive side direct current power source. The direct current power source Psn is a negative side direct current power source. One end of the direct current power source Psp is connected to a positive side terminal P that outputs voltage with positive polarity (positive voltage). One end of the direct current power source Psn is connected to a negative side terminal N that outputs voltage with negative polarity (negative voltage). A series connection point of the direct current power source Psp and direct current power source Psn is connected to a neutral terminal O that outputs a null voltage. The neutral terminal O is connected to the terminal S of the single phase alternating current power source 1.

The inverter circuit 40 has switching elements Q1 and Q2 and bidirectional switch elements S1 and S2 as main components.

The switching elements Q1 and Q2 are connected in series, configuring a switching element series circuit. The switching element series circuit is connected between the positive side terminal P and negative side terminal N of the direct current power source series circuit 30. A series connection point of the switching elements Q1 and Q2 is connected to an alternating current output terminal U (a first alternating current output terminal) for outputting an alternating current voltage from the inverter circuit 40. Further, the neutral terminal O of the direct current power source series circuit 30 is connected to an alternating current output terminal V (a second alternating current output terminal) for outputting an alternating current voltage from the inverter circuit 40.

The bidirectional switch element S1 (first bidirectional switch element) is connected between the alternating current output terminal U and the terminal R. The bidirectional switch element S2 (second bidirectional switch element) is connected between the alternating current output terminal U and the neutral terminal O.

The filter circuit 5 is a circuit wherein a reactor Lf1 and a capacitor Cf1 are connected in series. The filter circuit 5 is connected between the alternating current output terminal U and alternating current output terminal V (hereafter referred to as between the alternating current output terminals U and V). The load 6 is connected to both ends of the capacitor Cf1. The filter circuit 5 eliminates a harmonic component from an alternating current voltage Vu output between the alternating current output terminals U and V of the inverter circuit 40.

Herein, the switching elements Q1 and Q2 are configured of IGBTs (insulated gate bipolar transistors) whose diodes are connected in anti-parallel. The switching elements Q1 and Q2 may be configured of other semiconductor elements instead of the IGBTs, provided that turning on and off operations are possible at a frequency sufficiently higher than a commercial frequency.

Also, configuration examples of the bidirectional switch elements S1 and S2 are shown in FIG. 2(*a*) to FIG. 2(*d*). The bidirectional switch element shown in FIG. 2(*a*) is configured by two reverse blocking IGBTs (insulated gate bipolar transistors) being connected in anti-parallel. The bidirectional switch element shown in FIG. 2(*b*) is configured by a pair of circuits, wherein an IGBT that does not have reverse blocking breakdown voltage and a diode are connected in series, being connected in anti-parallel. The bidirectional switch element shown in FIG. 2 (*c*) is configured by a pair of switching elements, wherein an IGBT that does not have reverse blocking breakdown voltage and a diode are connected in anti-parallel, being connected in anti-series. The bidirectional switch element shown in FIG. 2(*d*) is of a configuration wherein the IGBT is replaced with a MOSFET (metal oxide semiconductor field effect transistor) in the bidirectional switch element shown in FIG. 2(*c*).

The heretofore described switching element configurations and bidirectional switch element configurations also apply to switching element configurations and bidirectional switch element configurations referred to in the following description.

The inverter circuit 40 operates so as to select and turn on any one element of the switching elements Q1 and Q2 and bidirectional switch elements S1 and S2, and turn off the other three elements. By this action, the inverter circuit 40 can output one level of voltage selected from four levels of voltage, those being a null voltage having the potential of the neutral terminal O as a reference, a positive voltage Vp and negative voltage Vn of the direct current power source series circuit 30, and a voltage Vr of the single phase alternating current power source 1.

Specifically, when the switching element Q1 is turned on, the positive voltage Vp of the direct current power source Psp is output to the alternating current output terminal U. When the switching element Q2 is turned on, the negative voltage Vn of the direct current power source Psn is output to the alternating current output terminal U. When the bidirectional switch element S1 is turned on, the voltage Vr of the R terminal of the single phase alternating current power source 1 is output to the alternating current output terminal U. When the bidirectional switch element S2 is turned on, the null voltage is output to the alternating current output terminal U. That is, the inverter circuit 40, by selecting and turning on any one element of the switching elements Q1 and Q2 and bidirectional switch elements S1 and S2, can output any one level of voltage of four levels of voltage, those being the null voltage having the potential of the neutral terminal O as a reference, the positive voltage Vp and negative voltage Vn of the direct current power source series circuit 30, and the voltage Vr of the single phase alternating current power source 1, to the alternating current output terminal U.

The control circuit 200 divides the cycle of an alternating current voltage command Vu*, to be described hereafter, into a plurality of control periods. The control circuit 200 takes these control periods to be a control cycle T. The control circuit 200, in each control cycle, generates control signals G1 and G2 for turning the switching elements Q1 and Q2 on and off and control signals Gs1 and Gs2 for turning the bidirectional switch elements S1 and S2 on and off.

Herein, it is preferable that a control frequency fixed in accordance with the control cycle is a frequency sufficiently high with respect to the frequency of the alternating current voltage command Vu*. For example, when the frequency of the alternating current voltage command Vu* is a commercial frequency, it is preferable that the control frequency is 1 kHz or higher. Also, it not being necessary that the control cycle is always synchronous with the cycle of the alternating current voltage command Vu*, the control cycle may be asynchronous.

Figure 3:
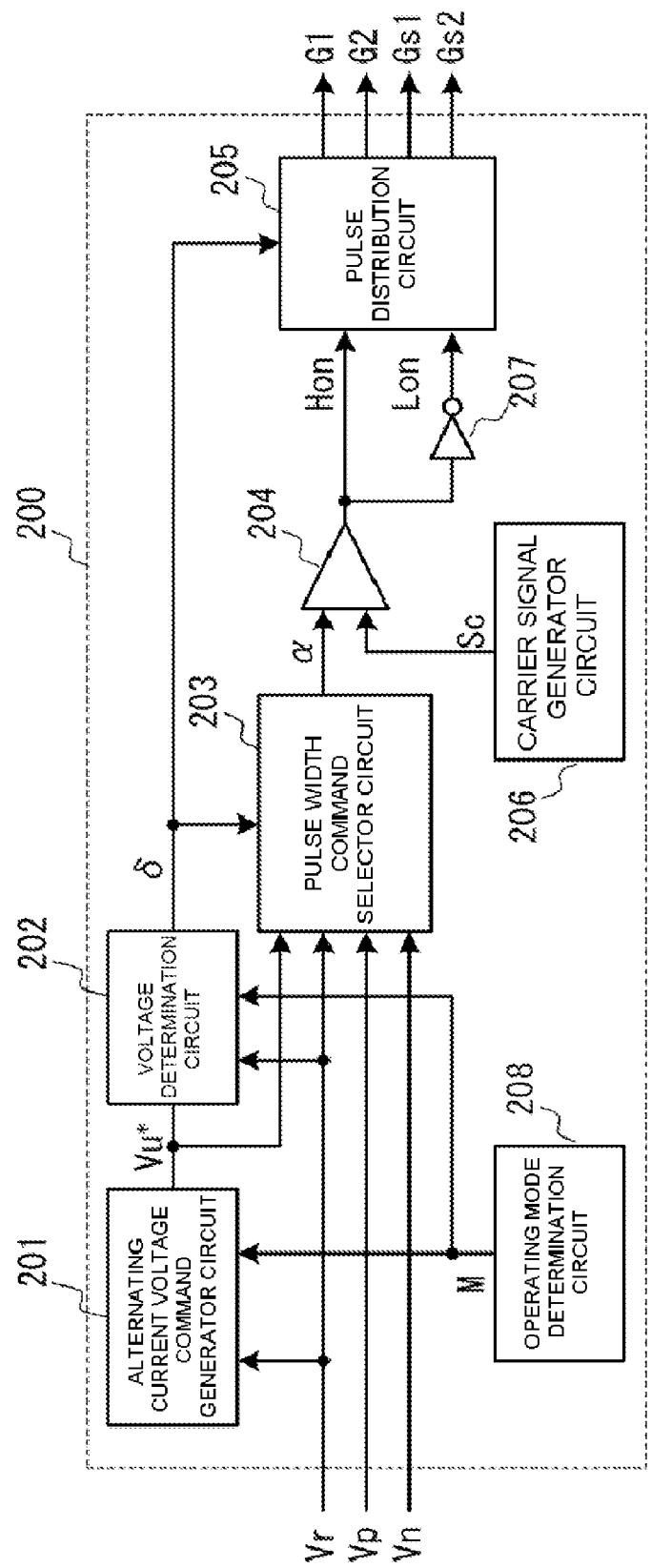
FIG. 3 is a block diagram for illustrating an operation of a control circuit.

FIG. 3 is a block diagram for illustrating an operation whereby the control circuit 200 generates the control signals G1, G2, Gs1, and Gs2.

The voltage Vr of the single phase alternating current power source 1, the positive voltage Vp of the direct current power source Psp, and the negative voltage Vn of the direct current power source Psn are input into the control circuit 200. The voltage Vr of the single phase alternating current power source 1 is detected by a voltage detector 301. The positive voltage Vp of the direct current power source Psp is detected by a voltage detector 401. The negative voltage Vn of the direct current power source Psn is detected by a voltage detector 402. The control circuit 200, using the alternating current voltage command Vu* generated from these three voltages and the voltage Vr, generates control signals for the switching elements Q1 and Q2 and bidirectional switch elements S1 and S2.

In order to do this, the control circuit 200 includes an alternating current voltage command generator circuit 201, a voltage determination circuit 202, a pulse width command selector circuit 203, a comparator 204, a pulse distribution circuit 205, a carrier signal generator circuit 206, a logic inverter 207, and an operating mode determination circuit 208. Then, the control circuit 200 generates the control signals G1 and G2 and the control signals Gs1 and Gs2 as follows.

Firstly, the operating mode determination circuit 208 determines a mode for operating the inverter circuit 40, and generates an operating mode signal M. The inverter circuit 40 has two operating modes, a start-up mode and a steady-state mode. The start-up mode is an operating mode whereby the inverter circuit 40 raises the output voltage from zero to a predetermined value in accordance with the alternating current voltage command Vu*. The steady-state mode is an operating mode whereby, after the output voltage has risen to the predetermined value, the inverter circuit 40 maintains the output voltage at the predetermined value in accordance with the alternating current voltage command Vu*.

In order to clarify the overall configuration of the control circuit 200 and an operation thereof, firstly, a description will be given of when the inverter circuit 40 operates in the steady-state mode.

The operating mode signal M and voltage Vr are input into the alternating current voltage command generator circuit 201. When the operating mode signal M commands the steady-state mode, the alternating current voltage command generator circuit 201 generates the alternating current voltage command Vu* based on the voltage Vr. The alternating current voltage command Vu*, for example, is an alternating current voltage command synchronous with the voltage Vr of the single phase alternating current power source 1, and having an amplitude equivalent to that of the rated voltage of the single phase alternating current power source 1.

It is also possible for the alternating current voltage command Vu* to be an alternating current voltage command asynchronous with the voltage Vr of the single phase alternating current power source 1. Also, it is also possible for the alternating current voltage command Vu* to be an alternating current voltage command having an amplitude differing from that of the rated voltage of the single phase alternating current power source 1, that is, an alternating current voltage command fixed in accordance with the input voltage specifications of the load 6, or the like.

The operating mode signal M, voltage Vr, and alternating current voltage command Vu* are input into the voltage determination circuit 202. When the operating mode signal M commands the steady-state mode, the voltage determination circuit 202, using the voltage Vr and alternating current voltage command Vu*, outputs a range signal δ to which the current control period belongs. The range signal δ is divided into ranges 1 to 6.

FIG. 4 is a diagram for illustrating a relationship between a range determination carried out by the control circuit 200, and a pulse width command α and element selection.

When the relationship between the alternating current voltage command Vu* and voltage Vr is such that Vu*≥0 and Vr<0, the voltage determination circuit 202 determines that the control period is range 1.

When the relationship between the alternating current voltage command Vu* and voltage Vr is such that Vu*≥0, Vr≥0, and Vr<Vu*, the voltage determination circuit 202 determines that the control period is range 2.

When the relationship between the alternating current voltage command Vu* and voltage Vr is such that Vu*≥0, Vr≥0, and Vr≥Vu*, the voltage determination circuit 202 determines that the control period is range 3.

When the relationship between the alternating current voltage command Vu* and voltage Vr is such that Vu*<0, Vr<0, and Vr≤Vu*, the voltage determination circuit 202 determines that the control period is range 4.

When the relationship between the alternating current voltage command Vu* and voltage Vr is such that Vu*<0, Vr<0, and Vr>Vu*, the voltage determination circuit 202 determines that the control period is range 5.

When the relationship between the alternating current voltage command Vu* and voltage Vr is such that Vu*<0 and Vr≥0, the voltage determination circuit 202 determines that the control period is range 6.

In each range, one element of the four elements—the switching elements Q1 and Q2 and the bidirectional switch elements S1 and S2—is selected as an H-arm element. Further, another one element of the four elements is selected as an L-arm element. The elements not selected as either the H-arm element or L-arm element become off-state arm elements.

The H-arm element is an element that, by being turned on, can output to the alternating current output terminal U a voltage (a first voltage), of the four levels of voltage, whose absolute value is equal to or higher than the absolute value of the alternating current voltage command Vu*, and whose value is nearest to the alternating current voltage command Vu*. The H-arm element is in an on-state for a time (an H-arm on-state time) corresponding to the pulse width command α, to be described hereafter.

The L-arm element is an element that, by being turned on, can output to the alternating current output terminal U a voltage (a second voltage), of the four levels of voltage, whose absolute value is lower than the absolute value of the alternating current voltage command Vu*, and whose value is nearest to the alternating current voltage command Vu*. The L-arm element is in an on-state for a time (an L-arm on-state time) that is obtained by subtracting the H-arm on-state time from the control cycle T.

The off-state arm elements are constantly in an off-state during the control period.

Returning to FIG. 3, the voltage Vr, positive voltage Vp, negative voltage Vn, alternating current voltage command Vu*, and range signal δ are input into the pulse width command selector circuit 203. Based on the input signals, the pulse width command selector circuit 203 computes the pulse width command α for the H-arm element (the ratio of the on-state time with respect to the control cycle T).

The pulse width commands α for the ranges 1 to 6 are obtained from the following equations.

[Math. 1]

$$\text{Range 1 pulse width command } \alpha \; \alpha = Vu^*/Vp \tag{1}$$

$$\text{Range 2 pulse width command } \alpha \; \alpha = (Vu^* - Vr)/(Vp - Vr) \tag{2}$$

$$\text{Range 3 pulse width command } \alpha \; \alpha = Vu^*/Vr \tag{3}$$

$$\text{Range 4 pulse width command } \alpha \; \alpha = Vu^*/Vr \tag{4}$$

$$\text{Range 5 pulse width command } \alpha \; \alpha = (Vu^* - Vr)/(Vn - Vr) \tag{5}$$

$$\text{Range 6 pulse width command } \alpha \; \alpha = Vu^*/Vn \tag{6}$$

The pulse width command α and a carrier signal Sc generated in the carrier signal generator circuit 206 are input into the comparator 204. The comparator 204 compares the pulse width command α and carrier signal Sc, and generates a signal Hon for turning the H-arm element on. When the H-arm turn-on signal Hon is at a high level, the H-arm element is in an on-state for the H-arm on-state time within the control period.

The logic inverter 207 inverts a high level or low level of the H-arm turn-on signal Hon to the low level or high level, thereby generating a signal Lon for turning the L-arm element on. When the L-arm turn-on signal Lon is at the high level, the L-arm element is in an on-state for the L-arm on-state time within the control period.

The H-arm turn-on signal Hon, L-arm turn-on signal Lon, and range signal δ are input into the pulse distribution circuit 205. The pulse distribution circuit 205 distributes the H-arm turn-on signal Hon to the control signal of the H-arm element selected in accordance with the range signal δ. Also, the pulse distribution circuit 205 distributes the L-arm turn-on signal Lon to the control signal of the L-arm element selected in accordance with the range signal δ. Then, the pulse distribution circuit 205 generates control signals for turning off the off-state arm elements for the control period.

As heretofore described, the H-arm element is an element that, by being turned on, can output between the alternating current output terminals U and V the voltage (first voltage), of the four levels of voltage, whose absolute value is equal to or higher than the absolute value of the alternating current voltage command Vu*, and whose value is nearest to the alternating current voltage command Vu*. Also, the L-arm element is an element that, by being turned on, can output between the alternating current output terminals U and V the voltage (second voltage), of the four levels of voltage, whose absolute value is lower than that of the alternating current voltage command Vu*, and whose value is nearest to the alternating current voltage command Vu*.

According to FIG. 4, in the case of range 1, the H-arm element is the switching element Q1, the L-arm element is the bidirectional switch element S2, and the off-state arm elements are the switching element Q2 and bidirectional switch element S1. In the case of range 2, the H-arm element is the switching element Q1, the L-arm element is the bidirectional switch element S1, and the off-state arm elements are the switching element Q2 and bidirectional switch element S2. In the case of range 3, the H-arm element is the bidirectional switch element S1, the L-arm element is the bidirectional switch element S2, and the off-state arm elements are the switching elements Q1 and Q2. In the case of range 4, the H-arm element is the bidirectional switch element S1, the L-arm element is the bidirectional switch element S2, and the off-state arm elements are the switching elements Q1 and Q2. In the case of range 5, the H-arm element is the switching element Q2, the L-arm element is the bidirectional switch element S1, and the off-state arm elements are the switching element Q1 and bidirectional switch element S2. In the case of range 6, the H-arm element is the switching element Q2, the L-arm element is the bidirectional switch element S2, and the off-state arm elements are the switching element Q1 and bidirectional switch element S1.

Figure 5:
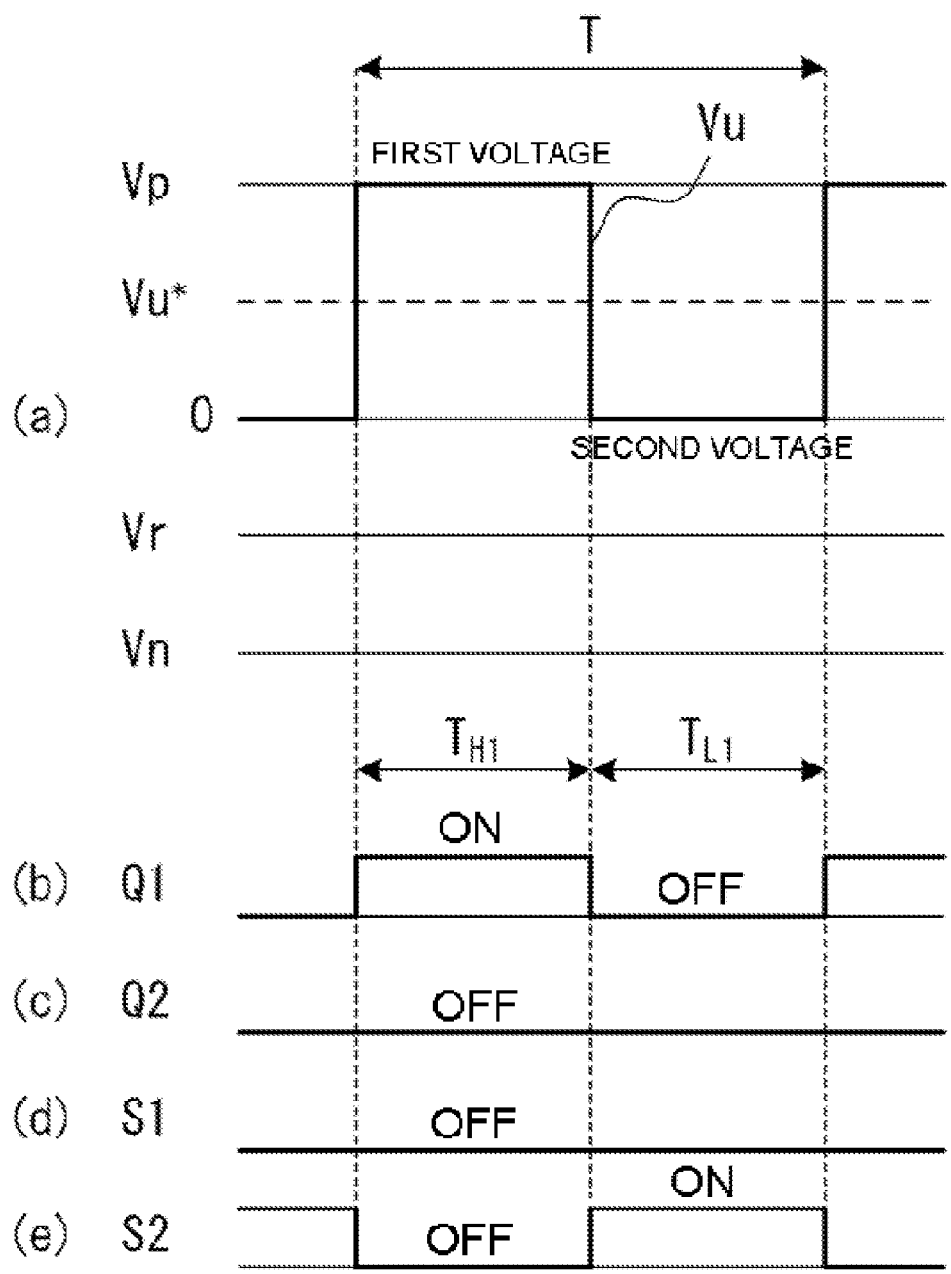
FIG. 5 is a diagram for illustrating an alternating current output voltage in range 1.
Figure 6:
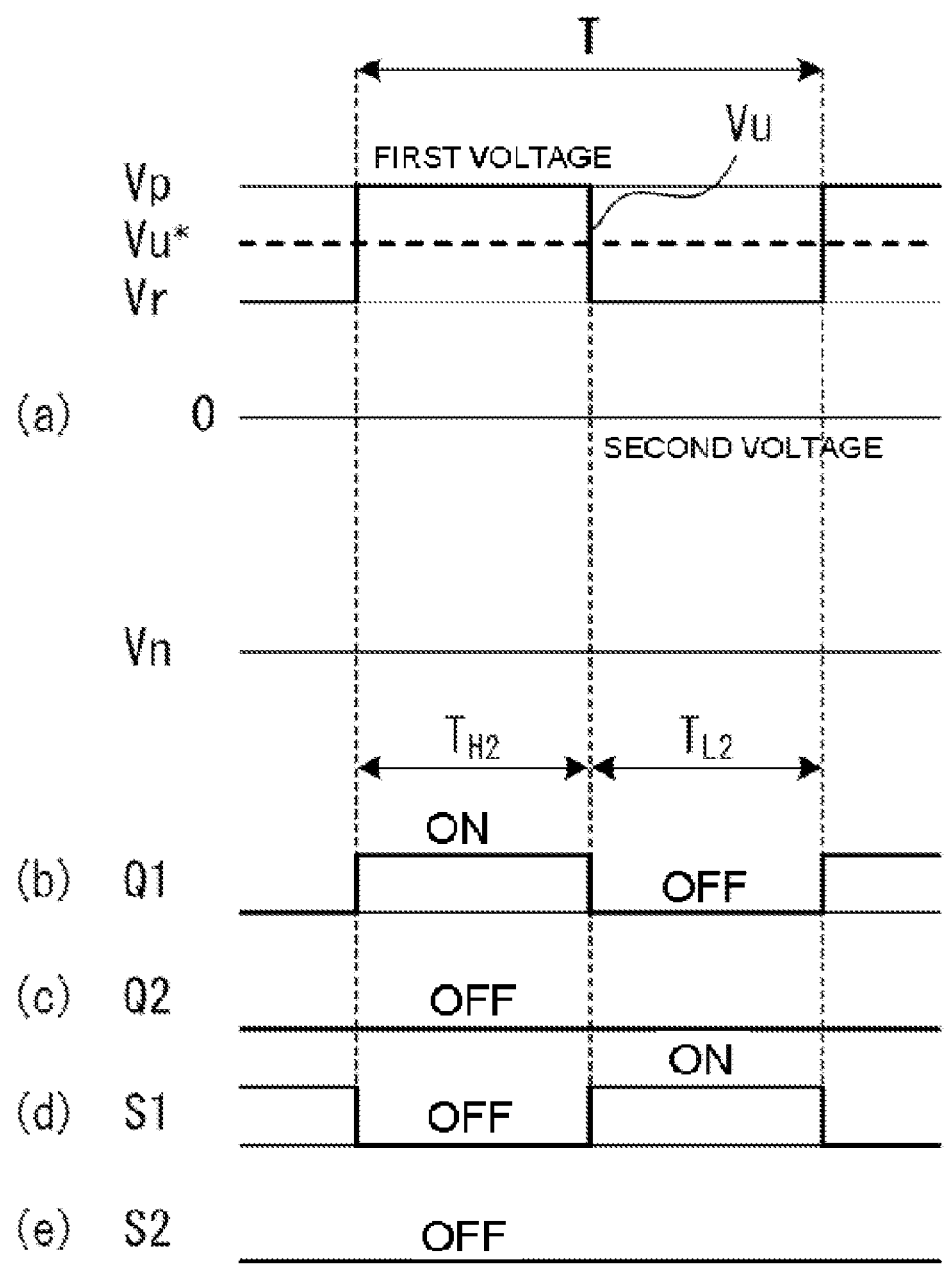
FIG. 6 is a diagram for illustrating an alternating current output voltage in range 2.
Figure 7:
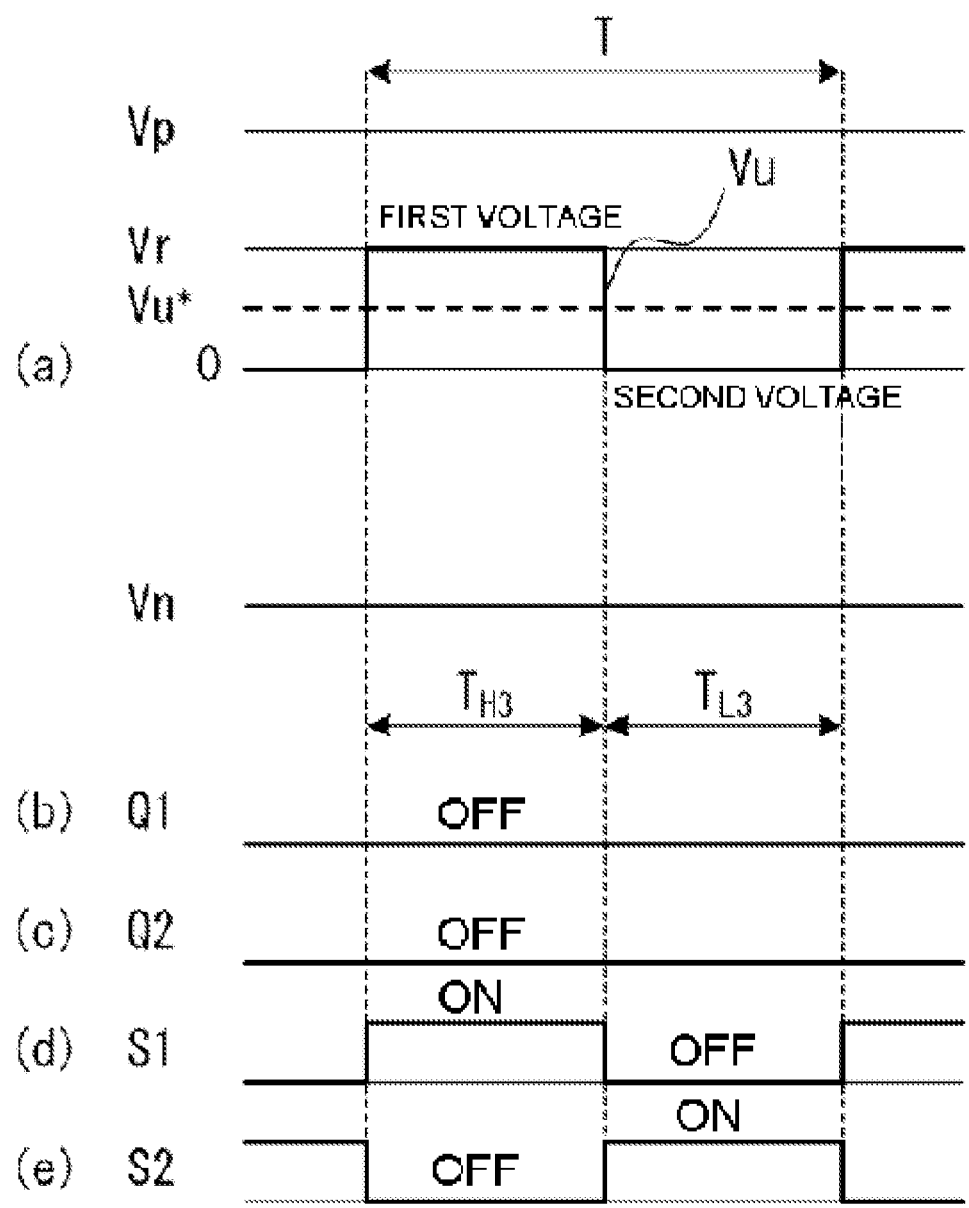
FIG. 7 is a diagram for illustrating an alternating current output voltage in range 3.

Next, a description will be given, referring to FIG. 5 to FIG. 7, of the relationship between an alternating current output voltage Vu and the turning on and off operations of the four elements in the control period when the alternating current voltage command Vu* is equal to or higher than the null voltage (ranges 1 to 3).

FIG. 5(a) is a diagram for illustrating the alternating current output voltage Vu in range 1. FIG. 5(b) shows the on-off state of the switching element Q1. FIG. 5(c) shows the on-off state of the switching element Q2. FIG. 5(d) shows the on-off state of the bidirectional switch element S1. FIG. 5(e) shows the on-off state of the bidirectional switch element S2.

In this range, the H-arm element is the switching element Q1. The L-arm element is the bidirectional switch element S2. The off-state arm elements are the switching element Q2 and bidirectional switch element S1. Consequently, the switching element Q1 is turned on for an on-state time $T_{H1}$ (FIG. 5(b)). Subsequently, the bidirectional switch element S2 is turned on for an on-state time $T_{L1}$ (FIG. 5(e)). The switching element Q2 and bidirectional switch element S1 are in an off-state (FIG. 5(c) and FIG. 5(d)).

The on-state time $T_{H1}$ is a time computed with respect to the control cycle T based on the pulse width command α obtained from Equation (1). The on-state time $T_{L1}$ is a time that is obtained by subtracting the on-state time $T_{H1}$ from the control cycle T.

Then, when the switching element Q1 is turned on, the positive voltage Vp, which is the first voltage, is output between the alternating current output terminals U and V. When the bidirectional switch element S2 is turned on, the null voltage, which is the second voltage, is output between the alternating current output terminals U and V (FIG. 5(a)). The average value of the voltages output between the alternating current output terminals U and V is equivalent to the alternating current voltage command Vu*.

The voltages output within the control period may also be in the order of the second voltage and the first voltage. The same applies to the following description.

FIG. 6(a) is a diagram for illustrating the alternating current output voltage Vu in range 2. FIG. 6(b) shows the on-off state of the switching element Q1. FIG. 6(c) shows the on-off state of the switching element Q2. FIG. 6(d) shows the on-off state of the bidirectional switch element S1. FIG. 6(e) shows the on-off state of the bidirectional switch element S2.

In this range, the H-arm element is the switching element Q1. The L-arm element is the bidirectional switch element S1. The off-state arm elements are the switching element Q2 and bidirectional switch element S2. Consequently, the switching element Q1 is turned on for an on-state time $T_{H2}$ (FIG. 6(b)). Subsequently, the bidirectional switch element S1 is turned on for an on-state time $T_{L2}$ (FIG. 6(d)). The switching element Q2 and bidirectional switch element S2 are in an off-state (FIG. 6(c) and FIG. 6(e)).

The on-state time $T_{H2}$ is a time computed with respect to the control cycle T based on the pulse width command α obtained from Equation (2). The on-state time $T_{L2}$ is a time that is obtained by subtracting the on-state time $T_{H2}$ from the control cycle T.

Then, when the switching element Q1 is turned on, the positive voltage Vp, which is the first voltage, is output between the alternating current output terminals U and V. When the bidirectional switch element S1 is turned on, the voltage Vr, which is the second voltage, is output between the alternating current output terminals U and V (FIG. 6(a)). The average value of the voltages output between the alternating current output terminals U and V is equivalent to the alternating current voltage command Vu*.

FIG. 7(a) is a diagram for illustrating the alternating current output voltage Vu in range 3. FIG. 7(b) shows the on-off state of the switching element Q1. FIG. 7(c) shows the on-off state of the switching element Q2. FIG. 7(d) shows the on-off state of the bidirectional switch element S1. FIG. 7(e) shows the on-off state of the bidirectional switch element S2.

In this range, the H-arm element is the bidirectional switch element S1. The L-arm element is the bidirectional switch element S2. The off-state arm elements are the switching element Q1 and switching element Q2. Consequently, the bidirectional switch element S1 is turned on for an on-state time $T_{H3}$ (FIG. 7(d)). Subsequently, the bidirectional switch element S2 is turned on for an on-state time $T_{L3}$ (FIG. 7(e)). The switching element Q1 and switching element Q2 are in an off-state (FIG. 7(b) and FIG. 7(c)).

The on-state time $T_{H3}$ is a time computed with respect to the control cycle T based on the pulse width command α obtained from Equation (3). The on-state time $T_{L3}$ is a time that is obtained by subtracting the on-state time $T_{H3}$ from the control cycle T.

Then, when the bidirectional switch element S1 is turned on, the voltage Vr, which is the first voltage, is output between the alternating current output terminals U and V. When the bidirectional switch element S2 is turned on, the null voltage, which is the second voltage, is output between the alternating current output terminals U and V (FIG. 7(a)). The average value of the voltages output between the alternating current output terminals U and V is equivalent to the alternating current voltage command Vu*.

Figure 8:
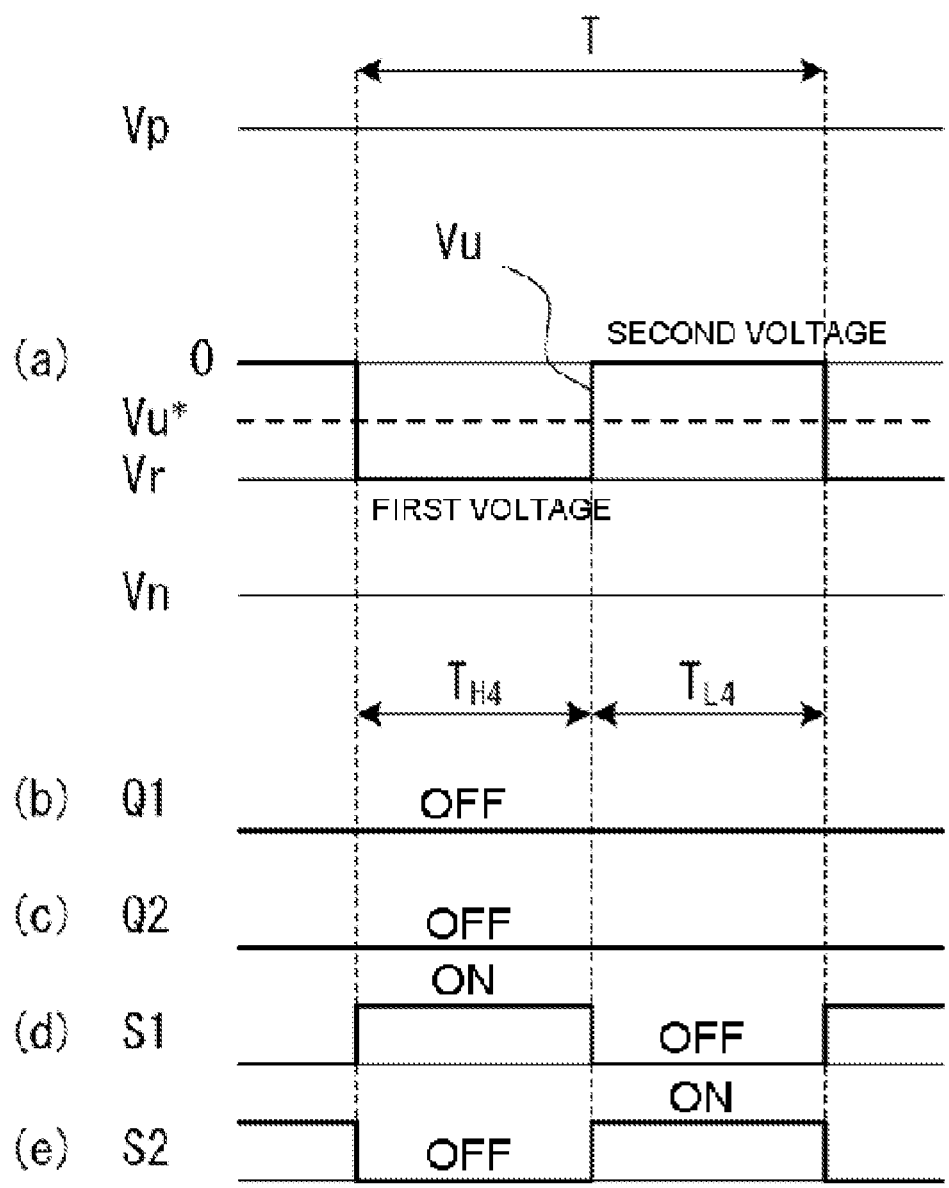
FIG. 8 is a diagram for illustrating an alternating current output voltage in range 4.
Figure 9:
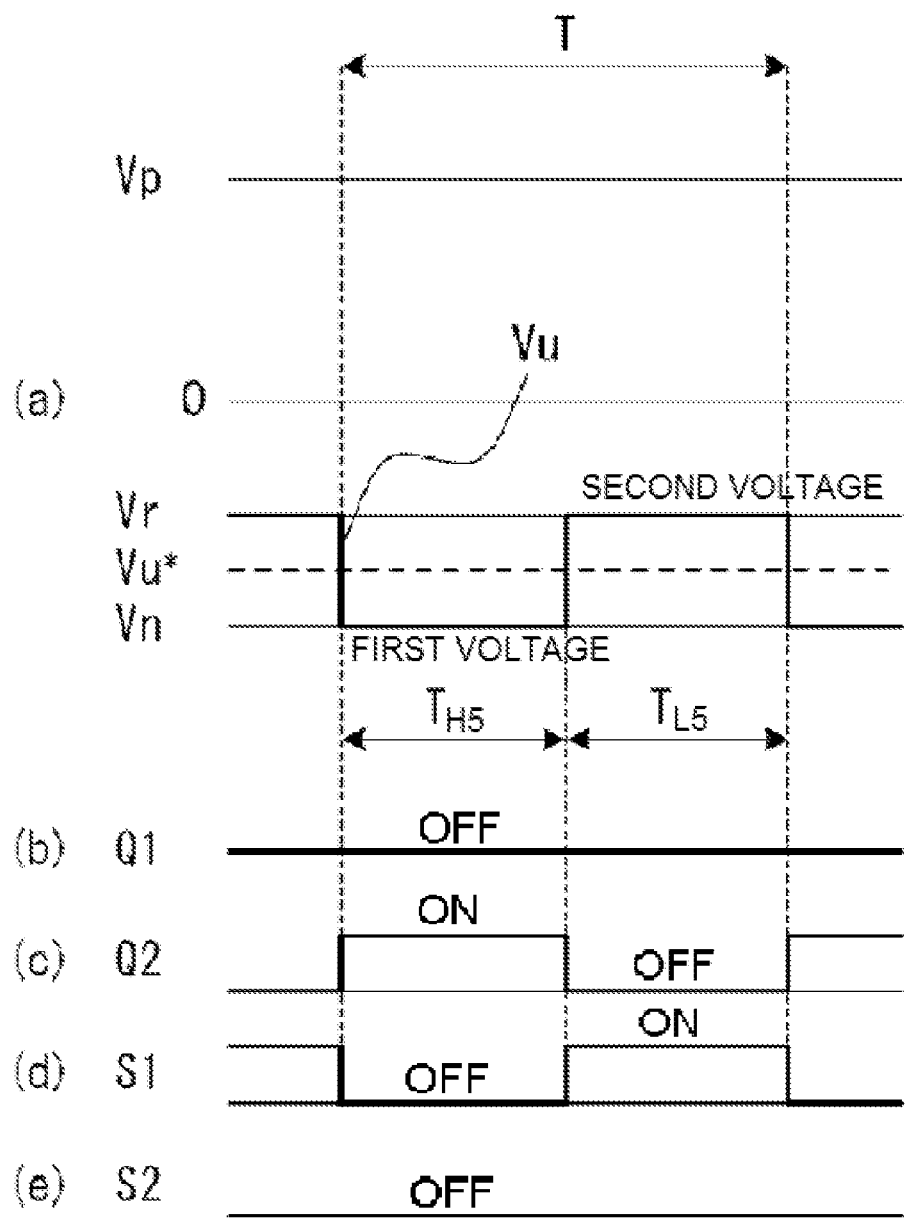
FIG. 9 is a diagram for illustrating an alternating current output voltage in range 5.
Figure 10:
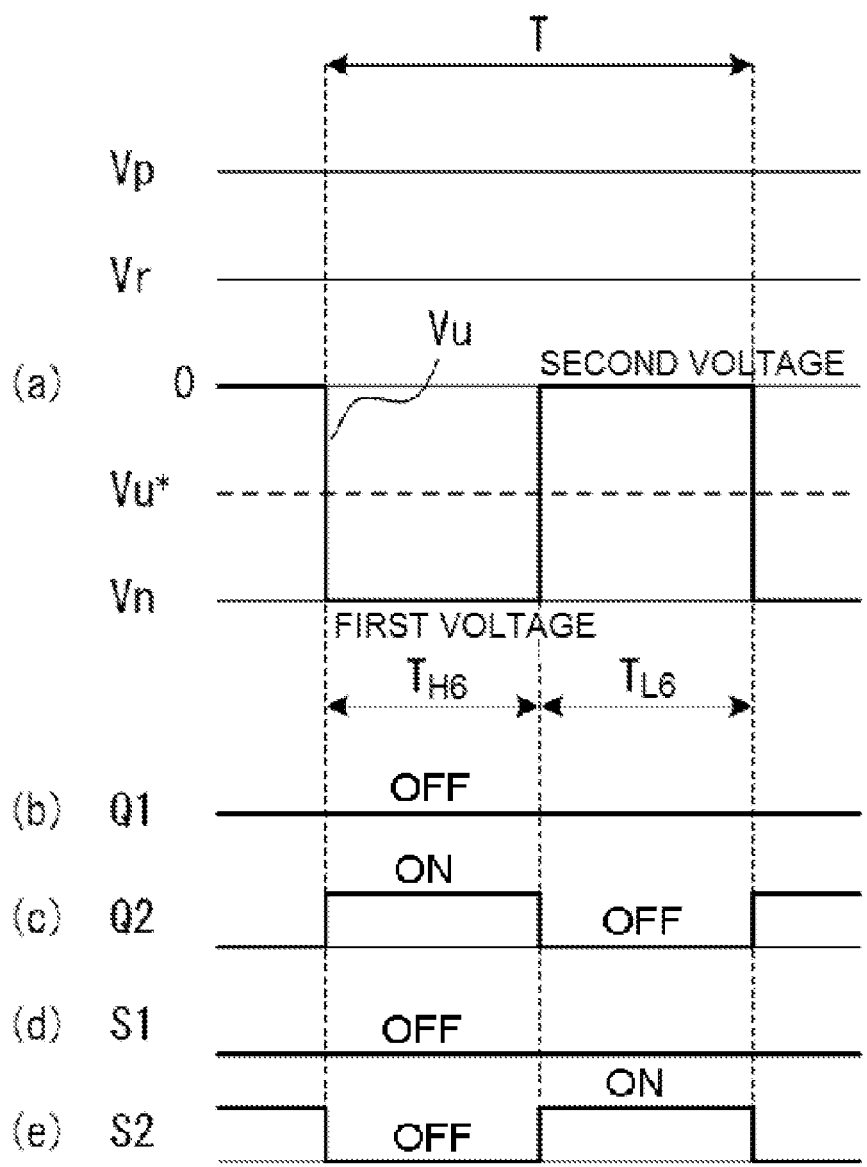
FIG. 10 is a diagram for illustrating an alternating current output voltage in range 6.

FIG. 8 to FIG. 10 are diagrams for illustrating the relationship between the alternating current output voltage Vu and the turning on and off operations of the four elements in the control period when the alternating current voltage command Vu* is lower than the null voltage (ranges 4 to 6).

FIG. 8 is a diagram for illustrating the alternating current output voltage Vu in range 4.

Range 4, owing to the symmetry of the circuit operations, is a range wherein the switching elements Q1 and Q2 and the bidirectional switch elements S1 and S2 perform essentially the same operations as in the case of range 3. In this range, voltages whose average voltage is equivalent to the alternating current voltage command Vu* are output between the alternating current output terminals U and V.

FIG. 9 is a diagram for illustrating the alternating current output voltage Vu in range 5.

Range 5, owing to the symmetry of the circuit operations, is a range wherein the operations of the switching element Q1 and switching element Q2 are reversed, and essentially the same operations as in the case of range 2 are performed. In this range, voltages whose average voltage is equivalent to the alternating current voltage command Vu* are output between the alternating current output terminals U and V.

FIG. 10 is a diagram for illustrating the alternating current output voltage Vu in range 6.

Range 6, owing to the symmetry of the circuit operations, is a range wherein the operations of the switching element Q1 and switching element Q2 are reversed, and essentially the same operations as in the case of range 1 are performed. In this range, voltages whose average voltage is equivalent to the alternating current voltage command Vu* are output between the alternating current output terminals U and V.

As heretofore described, the inverter circuit 40 according to the embodiment selects an H-arm element and an L-arm element for each control period. Further, the inverter circuit 40 can turn the H-arm element and L-arm element on in a complementary way, and for the respective predetermined on-state times thereof, in each control period, and generate voltages whose average voltage is equivalent to the alternating current voltage command Vu* between the alternating current output terminals U and V.

For example, when the voltage Vr is lower than the alternating current voltage command Vu*, the inverter circuit 40 can superimpose the positive voltage Vp or negative voltage Vn on the voltage Vr for a predetermined time using the operations of range 2 and range 5, thereby generating the alternating current output voltage Vu.

Also, when the voltage Vr is higher than the alternating current voltage command Vu*, the inverter circuit 40 can reduce the voltage Vr using the operations of range 3 and range 4, thereby generating the alternating current output voltage Vu.

Furthermore, the inverter circuit 40 can generate the alternating current output voltage Vu with a polarity opposite to that of the voltage Vr using the operations of range 1 and range 6. The alternating current output voltage Vu generated herein is a voltage whose phase deviates considerably from that of the voltage Vr.

That is, the inverter circuit 40 can maintain the alternating current output voltage Vu supplied to the load 6 at the alternating current voltage command Vu* using the null voltage having the potential of the neutral terminal O as a reference, the positive voltage Vp and negative voltage Vn of the direct current power source series circuit 30, and the voltage Vr of the single phase alternating current power source 1.

Note that the inverter circuit 40 cannot output a voltage higher than the positive voltage Vp or a voltage lower than the negative voltage Vn. Consequently, when the alternating current voltage command Vu* is a voltage higher than the positive voltage Vp, or when the alternating current voltage command Vu* is a voltage lower than the negative voltage Vn, it is appropriate to carry out a protective operation such as turning off all the elements.

Also, when the alternating current voltage command Vu* is a voltage higher than the positive voltage Vp, the switching element Q1 may be constantly maintained in an on-state. Further, when the alternating current voltage command Vu* is a voltage lower than the negative voltage Vn, the switching element Q2 may be constantly maintained in an on-state.

Figure 18:
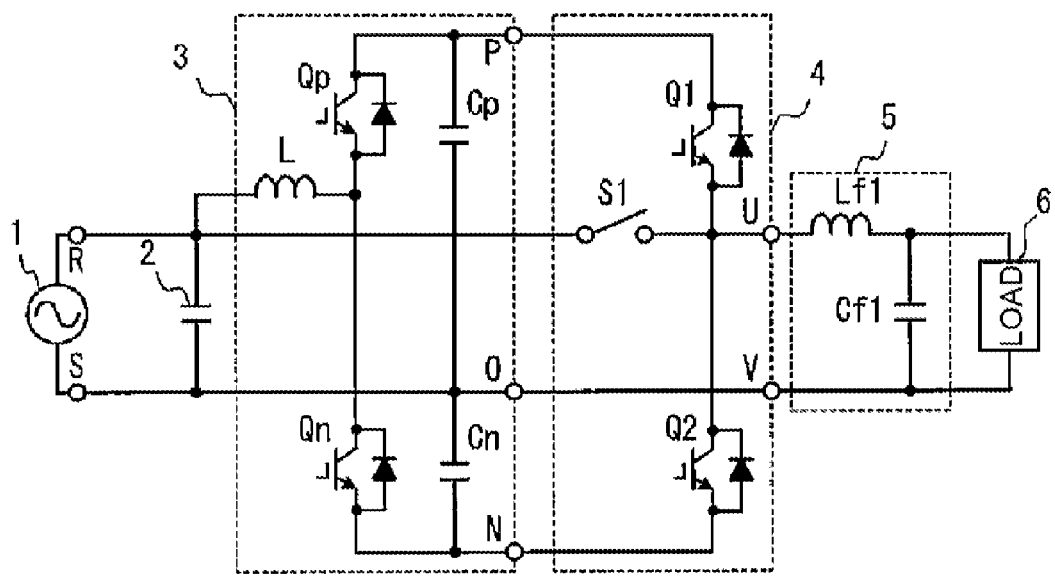
FIG. 18 is a diagram for illustrating an inverter circuit according to heretofore known technology.

Operations are carried out turning on and off the switching elements of an inverter circuit 4 shown in FIG. 18 between the positive voltage and negative voltage of a direct current power source series circuit.

However, the inverter circuit 40 according to the embodiment is such that operations turning on and off the switching elements and bidirectional switch elements are carried out between the first voltage and second voltage. As heretofore described, the first voltage is a voltage whose absolute value is equal to or higher than the absolute value of the alternating current voltage command Vu*, and whose value is nearest to the alternating current voltage command Vu*. Also, the second voltage is a voltage whose absolute value is lower than that of the alternating current voltage command Vu*, and whose value is nearest to the alternating current voltage command Vu*. As is also clear from FIG. 5 to FIG. 10, the difference between the first voltage and second voltage is small in comparison with the sizes of the positive voltage Vp and negative voltage Vn.

Consequently, switching loss occurring when the switching elements of the inverter circuit 40 are turned on and turned off is smaller than the switching loss of the switching elements of the inverter circuit 4 shown in FIG. 18. In the same way, switching loss occurring when the bidirectional switch elements of the inverter circuit 40 are turned on and turned off is smaller than the switching loss of the switching elements of the inverter circuit 4 shown in FIG. 18.

That is, when the control frequency of the inverter circuit 40 is the same as the control frequency of the inverter circuit 4, switching loss in the inverter circuit 40 can be reduced in comparison with that in the inverter circuit 4 of FIG. 18.

In particular, it is preferable that the alternating current output voltage Vu is synchronized with the voltage Vr of the single phase alternating current power source 1. By synchronizing the alternating current output voltage Vu with the voltage Vr of the single phase alternating current power source 1, it is possible to reduce the voltage applied to the switching elements Q1 and Q2 and bidirectional switch elements S1 and S2. As a result of this, it is possible to further reduce switching loss occurring in these elements.

Also, the alternating current output voltage Vu of the inverter circuit 40 according to the embodiment changes between the first voltage and second voltage. Consequently, the voltage applied to the reactor Lf1 decreases.

Ripple current flowing through the reactor Lf1 is proportional to the voltage-time product (voltage variation range× voltage pulse width) and inversely proportional to the inductance value. When the inductance values are the same, the voltage-time product applied to the reactor Lf1 decreases when using the inverter circuit 40 according to the embodiment, meaning that the ripple current flowing through the reactor Lf1 decreases. When the ripple current decreases, loss (mainly iron loss) in the reactor Lf1 decreases. Consequently, it is possible to reduce loss in the reactor Lf1.

Meanwhile, when arranging so that the sizes of the ripple currents are the same, it is possible to reduce the inductance value of the reactor Lf1. In this case, it is possible to reduce the size of the reactor Lf1.

Also, even in the event that an interruption of the single phase alternating current power source 1 occurs, the inverter circuit 40 according to the embodiment can select an H-arm element and an L-arm element for each control cycle, using the same logical process as when the single phase alternating current power source 1 is normal. Further, the inverter circuit 40 can turn the selected H-arm element and L-arm element on and off, thereby maintaining the alternating current output voltage Vu at the alternating current voltage command Vu*, in the same way as when the single phase alternating current power source 1 is normal.

Consequently, the inverter circuit 40 according to the embodiment does not need detection means for detecting an interruption of the single phase alternating current power source 1 when controlling in order to maintain the alternating current output voltage Vu at the alternating current voltage command Vu*.

Figure 12:
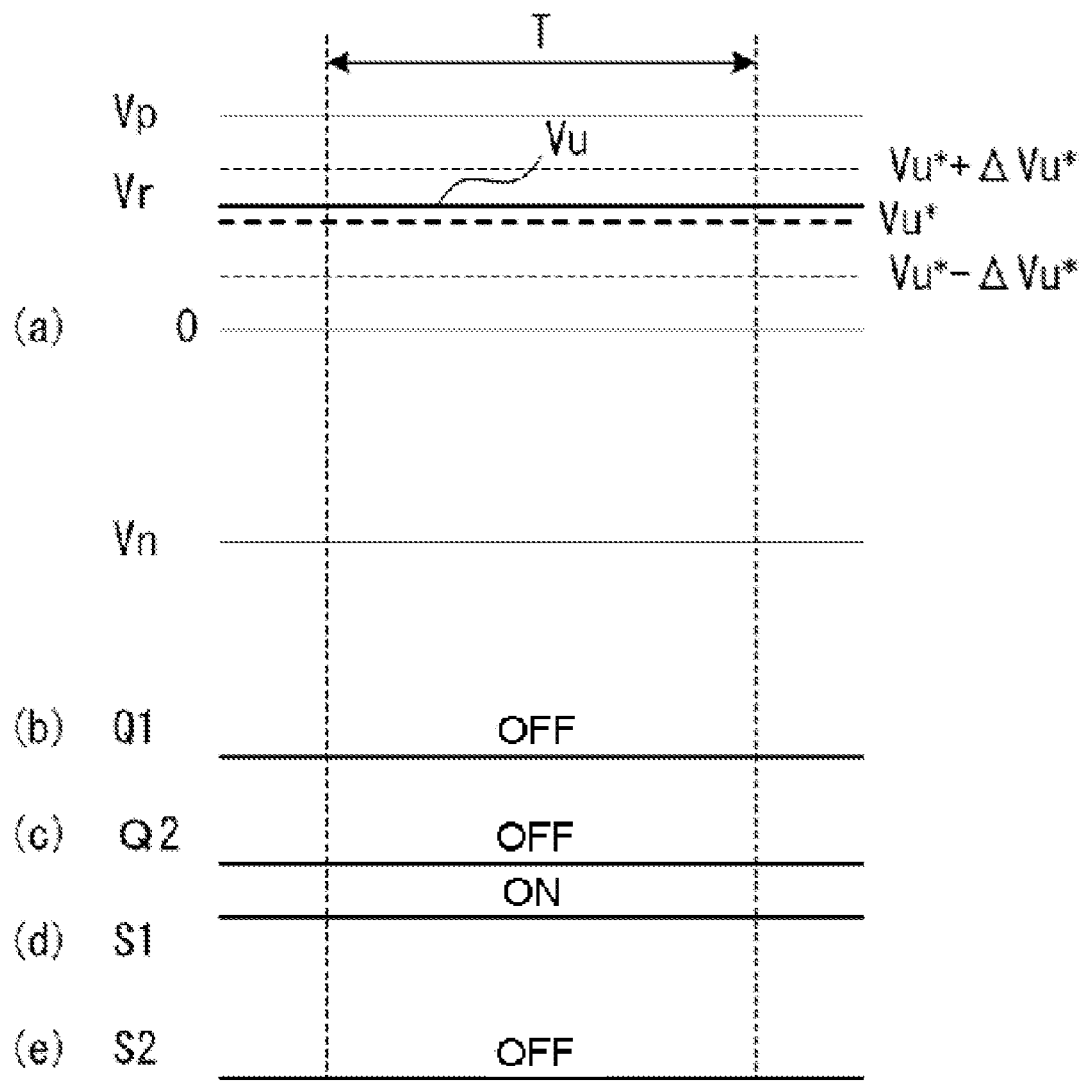
FIG. 12 is a diagram for illustrating an alternating current output voltage in range 7.

Next, FIG. 11 is a diagram for illustrating another relationship between a range determination carried out by the control circuit 200, and the pulse width command α and element selection. Also, FIG. 12 is a diagram for illustrating the alternating current output voltage Vu and operations of the switching elements Q1 and Q2 and bidirectional switch elements S1 and S2 in range 7.

The configuration of the control circuit 200 is the same configuration as that of the control circuit shown in FIG. 3. However, the voltage determination circuit 202 further determines range 7 in addition to ranges 1 to 6 shown in FIG. 4. Range 7 is a range for outputting the voltage Vr of the single phase alternating current power source 1 between the alternating current output terminals U and V.

Hereafter, referring to FIG. 3, FIG. 11, and FIG. 12, a description will be given centering on an operation of the control circuit 200 relating to range 7. Portions the same as the heretofore described ranges 1 to 6 will be omitted as appropriate.

The alternating current voltage command Vu* and the voltage Vr of the single phase alternating current power source 1 are input into the voltage determination circuit 202 for each control period. When the relationship between the two voltages satisfies the condition of $|Vu^*-Vr|<\Delta Vu^*$, the voltage determination circuit 202 determines that the control period is range 7. At this time, the voltage determination circuit 202 outputs a range signal δ indicating range 7.

ΔVu* is a reference variable for determining that the value of the voltage Vr of the single phase alternating current power source 1 is within a predetermined range with respect to the value of the alternating current voltage command Vu*. When the load 6 tolerates a fluctuation of the input voltage within a range of the alternating current voltage command Vu*±10%, the reference variable ΔVu* is a variable equivalent to 10% of the alternating current voltage command Vu*. The reference variable ΔVu* may also be a variable fixed in accordance with other conditions.

The pulse width command selector circuit 203 fixes the pulse width command α at 1.0 when the range signal δ indicating range 7 is input. When the pulse width command α is 1.0, the comparator 204 generates the signal Hon that turns on the H-arm element for the duration of the control period, regardless of the size of the carrier signal Sc. That is, for the duration of the control period, the H-arm turn-on signal Hon is constantly at the high level, while the L-arm turn-on signal Lon is constantly at the low level.

The pulse distribution circuit 205 sets the bidirectional switch element S1 as the H-arm element when the range signal δ indicating range 7 is input. Also, the pulse distribution circuit 205 sets the switching elements Q1 and Q2 and bidirectional switch element S2 as the off-state arm elements. Consequently, the pulse distribution circuit 205 outputs a control signal Gs1 of the bidirectional switch element S1 that is at the high level for the duration of the control period. At the same time, the pulse distribution circuit 205 outputs control signals G1, G2, and Gs2 of the switching elements Q1 and Q2 and bidirectional switch element S2 that are at the low level for the duration of the control period.

Consequently, the bidirectional switch element S1 is in an on-state, and the switching elements Q1 and Q2 and bidirectional switch element S2 are in an off-state, for the control period determined to be range 7. The voltage Vr of the single phase alternating current power source 1 is output between the alternating current output terminals U and V in accordance with the on-off states of the four elements.

Even when the alternating current voltage command Vu* has negative polarity, the control circuit 200 carries out the same kind of operation as when the alternating current voltage command Vu* has positive polarity.

Only the bidirectional switch element S1 is turned on, while the switching elements Q1 and Q2 and bidirectional switch element S2 are turned off, for the control period determined to be range 7. Therefore, conduction loss due to current conduction occurs only in the bidirectional switch element S1. As no current flows through the switching elements Q1 and Q2 and bidirectional switch element S2, no conduction loss occurs. Also, as no element carries out a switching on or off operation, no switching loss occurs.

Consequently, by providing range 7 in the operation of the inverter circuit 40, it is possible to further reduce power loss.

Next, a description will be given of when the inverter circuit 40 operates in start-up mode.

In this case, in FIG. 3, the operating mode determination circuit 208 outputs an operating mode signal M for operating the inverter circuit 40 in start-up mode. The operating mode signal M is input into the alternating current voltage command generator circuit 201 and voltage determination circuit 202.

The alternating current voltage command generator circuit 201 to which the start-up mode command is sued outputs an alternating current voltage command Vu* for causing the inverter circuit 40 to raise the output voltage from zero to a predetermined value. The alternating current voltage command Vu* in the start-up mode is an alternating current voltage command whose amplitude gradually increases from zero to a predetermined value.

Also, the voltage determination circuit 202 to which the start-up mode command is issued determines the range signal δ to be range 3 or range 4 shown in FIG. 4. When the relationship between the alternating current voltage command Vu* and voltage Vr is such that Vu*≥0, Vr≥0, and Vr≥Vu*, the control period range signal δ is range 3. Also, when the relationship between the alternating current voltage command Vu* and voltage Vr is such that Vu*<0, Vr<0, and Vr≤Vu*, the control period range signal δ is range 4.

As the operations of the pulse width command selector circuit 203, comparator 204, pulse distribution circuit 205, carrier signal generator circuit 206, and logic inverter 207 in the start-up mode are the same as in the steady-state mode, a description thereof will be omitted.

Figure 13:
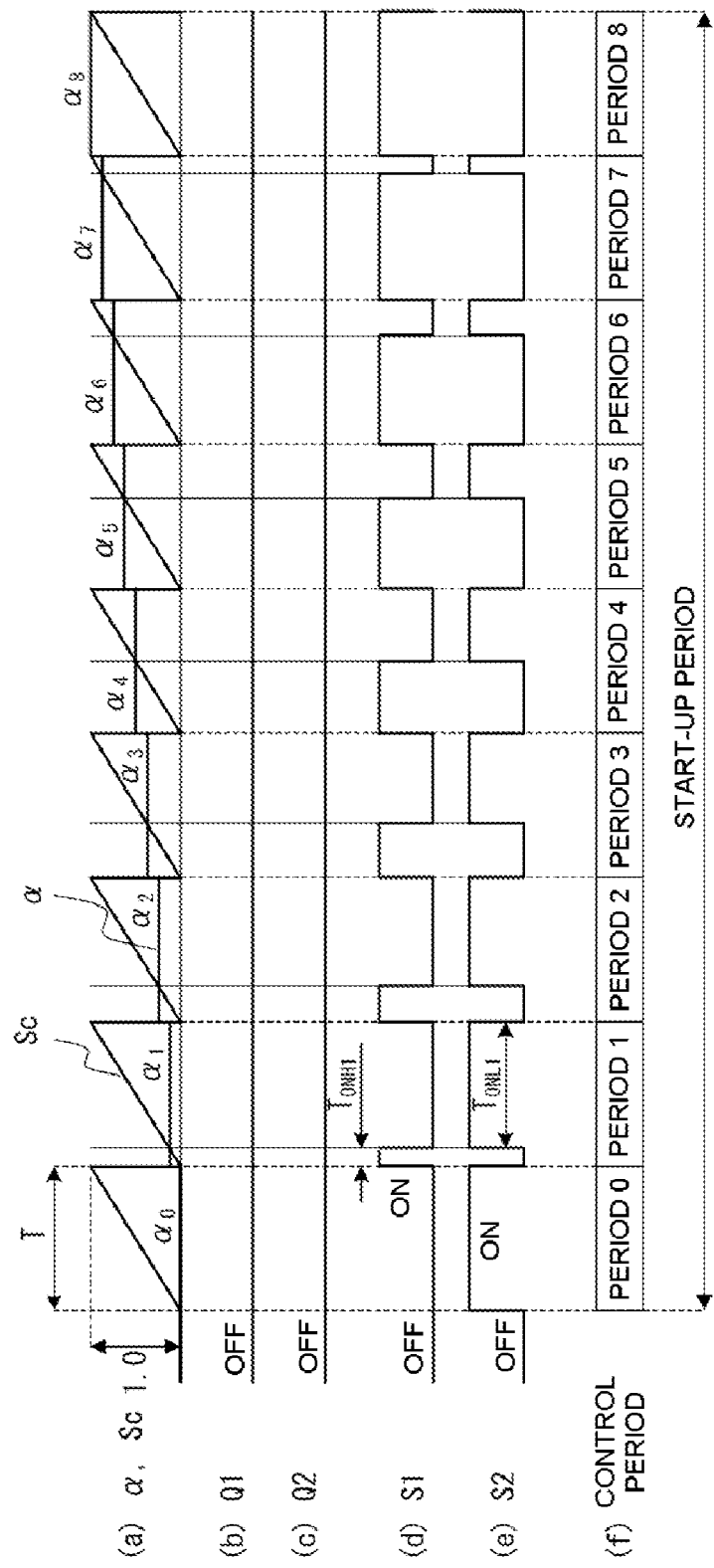
FIG. 13 is a diagram for illustrating a start-up mode operation.

FIG. 13 is a diagram for illustrating an operation when the inverter circuit 40 raises the alternating current output voltage Vu from a null voltage to a predetermined voltage in a period (a start-up period) formed of control periods 0 to 8 for which the inverter circuit 40 operates in start-up mode.

FIG. 13(*a*) is a diagram showing a relationship between the pulse width command α and the carrier signal Sc. FIG. 13(*b*)

shows the on-off state of the switching element Q1. FIG. 13(c) shows the on-off state of the switching element Q2. FIG. 13(d) shows the on-off state of the bidirectional switch element S1. FIG. 13(e) shows the on-off state of the bidirectional switch element S2.

In FIG. 13(a), the carrier signal Sc is a sawtooth wave that passes zero at the origin of each control period, and subsequently increases gradually, reaching a predetermined value at the endpoint of each control period. The pulse width command α is a value that normalizes the alternating current voltage command Vu* at the amplitude value of the voltage Vr of the single phase alternating current power source 1 in each control period, the maximum value thereof being 1.0. The value of the pulse width command α is $\alpha_0$ (=0) in control period 0, gradually increases to $\alpha_1, \alpha_2 \ldots$ as the control period progresses through 1, 2 . . . , and reaches $\alpha_8$ (=1.0) in control period 8.

In the start-up period shown in FIG. 13, the inverter circuit 40 operates so that the switching elements Q1 and Q2 are constantly in an off-state, and the bidirectional switch elements S1 and S2 are turned on and off alternately.

In control period 0, the value of the pulse width command α is $\alpha_0$ (=0). Consequently, the bidirectional switch element S1 is constantly in an off-state in this period, while the bidirectional switch element S2 is constantly in an on-state. Owing to this operation, a null voltage is output to the alternating current output terminal U.

In control period 1, the value of the pulse width command α is $\alpha_1$. Consequently, in this period, the bidirectional switch element S1 is in an on-state for a time $T_{ONH1}$ (=T×$\alpha_1$/1.0) from the origin of the period. At this time, the voltage Vr is output to the alternating current output terminal U. The bidirectional switch element S2 is in an on-state for a time $T_{ONL1}$ (=T−$T_{ONH1}$) after the bidirectional switch element S1 is turned off. At this time, a null voltage is output to the alternating current output terminal U. The average value of the alternating current output voltage Vu output to the alternating current output terminal U in control period 1 is equivalent to a voltage obtained by multiplying the voltage Vr in the control period by the value $\alpha_1$ of the pulse width command α. That is, the average value of the alternating current output voltage Vu in the control period is equivalent to the average value of the alternating current voltage command Vu*.

In control period 2 to control period 7, the inverter circuit 40 carries out the same kind of operation as in control period 1. In each period, the bidirectional switch element S1 is in an on-state for a time in accordance with the value of the pulse width command α from the origin of each the control period. At this time, the voltage Vr is output to the alternating current output terminal U. The bidirectional switch element S2 is in an on-state until the endpoint of each control period, after the bidirectional switch element S1 is turned off. At this time, a null voltage is output to the alternating current output terminal U. The average value of the alternating current output voltage Vu output to the alternating current output terminal U in each control period is equivalent to a voltage obtained by multiplying the voltage Vr in the control period by the value of the pulse width command α. That is, the average value of the alternating current output voltage Vu in the control period is equivalent to the average value of the alternating current voltage command Vu*.

In control period 8, the value of the pulse width command α is $\alpha_8$ (=1.0). Consequently, the bidirectional switch element S1 is constantly in an on-state in this period, while the bidirectional switch element S2 is constantly in an off-state. Owing to this operation, the voltage Vr is output to the alternating current output terminal U.

When the deviation between the voltage Vr of the single phase alternating current power source 1 and the fundamental wave element of the alternating current output voltage Vu comes within a predetermined range in the start-up mode, the operating mode determination circuit 208 switches the operating mode signal M to a signal commanding the steady-state mode. Thenceforth, the inverter circuit 40 operates in the steady-state mode as described above.

In the start-up mode operation description given above, the start-up period, not being limited to control periods 0 to 8, may be a period formed of fewer control periods, or alternatively, may be a period formed of more control periods. Also, the start-up period may be a period that starts in synchronization with the phase of the alternating current output voltage Vu, and is longer than the cycle of the alternating current output voltage Vu.

Also, the carrier signal Sc, not being limited to the sawtooth wave shown in FIG. 13(a), may be of another waveform, provided that it can cause the on-state time of the bidirectional switch element S1 in each control period to correspond to the value of the pulse width command α.

As heretofore described, the inverter circuit 40 causes the bidirectional switch elements S1 and S2 to be turned on and off in a complementary way in each control period in the start-up mode. At this time, the inverter circuit 40 carries out a so-called soft start operation whereby the on-state time of the bidirectional switch element S1 is gradually increased, and the on-state time of the bidirectional switch element S2 is gradually decreased, with the passing of time.

Owing to this operation, the voltage applied to the bidirectional switch elements S1 and S2 in the start-up mode is the voltage Vr of the single phase alternating current power source 1. Consequently, the inverter circuit 40 of the embodiment is such that it is possible to reduce turn-on loss and turn-off loss occurring in the bidirectional switch elements in the start-up mode. In the start-up mode, loss occurring in the switching elements is zero.

Also, the variation range of the voltage Vu output between the alternating current output terminals U and V in each control period in the start-up mode is the size of the voltage Vr of the single phase alternating current power source 1. Consequently, the inverter circuit 40 of the embodiment is such that it is possible to reduce the ripple current flowing through the filter circuit 5 in the start-up mode.

Furthermore, in the embodiment, the output voltage Vu of the inverter circuit 40 is supplied to the load 6 via the filter circuit 5, but the action of the inverter circuit 40 and advantages obtained thereby are the same even in an embodiment wherein the output voltage Vu of the inverter circuit 40 is supplied directly to the load 6.

Figure 14:
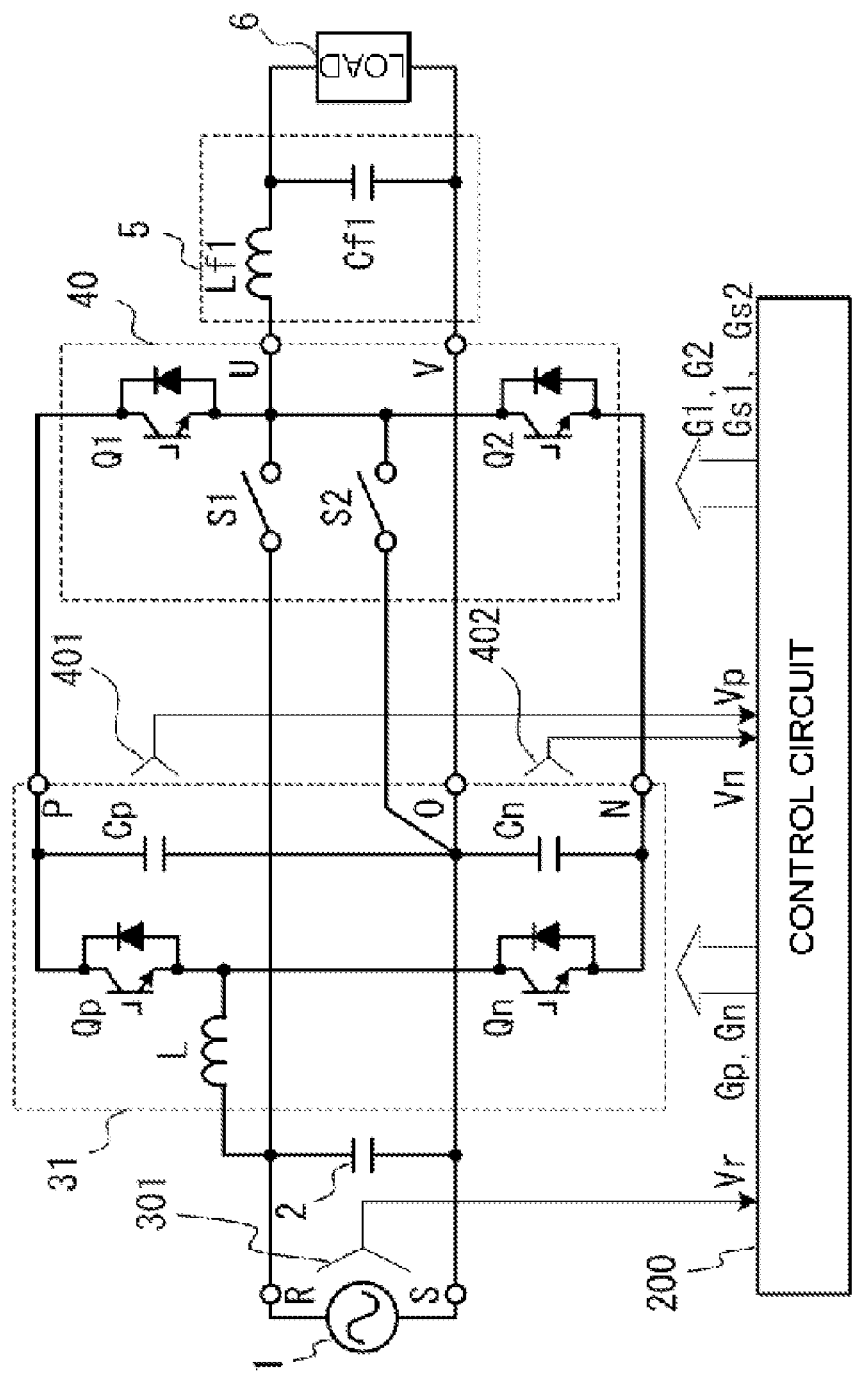
FIG. 14 is a diagram for illustrating a second embodiment of the invention.

FIG. 14 is a diagram for illustrating a second embodiment according to the invention. This embodiment is such that the direct current power source series circuit 30 according to the first embodiment shown in FIG. 1 is configured of a half-bridge converter circuit 31.

The converter circuit 31 has as main components a series circuit of a positive side switching element Qp and a negative side switching element Qn, a series circuit of a positive side capacitor Cp and a negative side capacitor Cn, and a reactor L. The reactor L is connected to the terminal R of the single phase alternating current power source 1 and a connection point of the switching elements Qp and Qn. The series circuit of the capacitors Cp and Cn is connected in parallel to the series circuit of the switching elements Qp and Qn. Also, a connection point of the capacitors Cp and Cn is connected to the terminal S of the single phase alternating current power source 1, and also connected to the alternating current output terminal V.

When the voltage Vr of the single phase alternating current power source 1 is of positive polarity with respect to the alternating current output terminal V, firstly, the switching element Qn is turned on, and the switching element Qp is turned off. By the switching element Qn being turned on, a voltage which is a negative voltage Vn of the capacitor Cn added to the voltage Vr of the single phase alternating current power source 1 is applied to the reactor L, and energy is accumulated in the reactor L. Next, the switching element Qn is turned off, and the switching element Qp is turned on. On the switching element Qn being turned off, the energy accumulated in the reactor L is charged in the capacitor Cp.

Meanwhile, when the voltage Vr of the single phase alternating current power source 1 is of negative polarity with respect to the alternating current output terminal V, firstly, the switching element Qp is turned on, and the switching element Qn is turned off. By the switching element Qp being turned on, a voltage which is a positive voltage Vp of the capacitor Cp added to the voltage Vr of the single phase alternating current power source 1 is applied to the reactor L, and energy is accumulated in the reactor L. Next, the switching element Qp is turned off, and the switching element Qn is turned on. On the switching element Qp being turned off, the energy accumulated in the reactor L is charged in the capacitor Cn.

The heretofore described turning on and off operations of the switching elements Qp and Qn are carried out at a frequency sufficiently higher than the frequency of the single phase alternating current power source 1. By the switching elements Qp and Qn being turned on and off, the positive voltage Vp of the capacitor Cp and the negative voltage Vn of the capacitor Cn are maintained at a predetermined voltage higher than the amplitude value of the voltage Vr of the alternating current power source 1.

In this way, it is possible to configure the direct current power source series circuit 30 with the half-bridge converter 31. The capacitor Cp of the half-bridge converter 31 corresponds to the positive side direct current power source Psp of the direct current power source series circuit 30. Also, the capacitor Cn of the half-bridge converter 31 corresponds to the negative side direct current power source Psn of the direct current power source series circuit 30.

The inverter circuit 40 of this embodiment acts in the same way as the inverter circuit 40 of the first embodiment illustrated using FIG. 1 to FIG. 13, and the same advantages are obtained.

Figure 15:
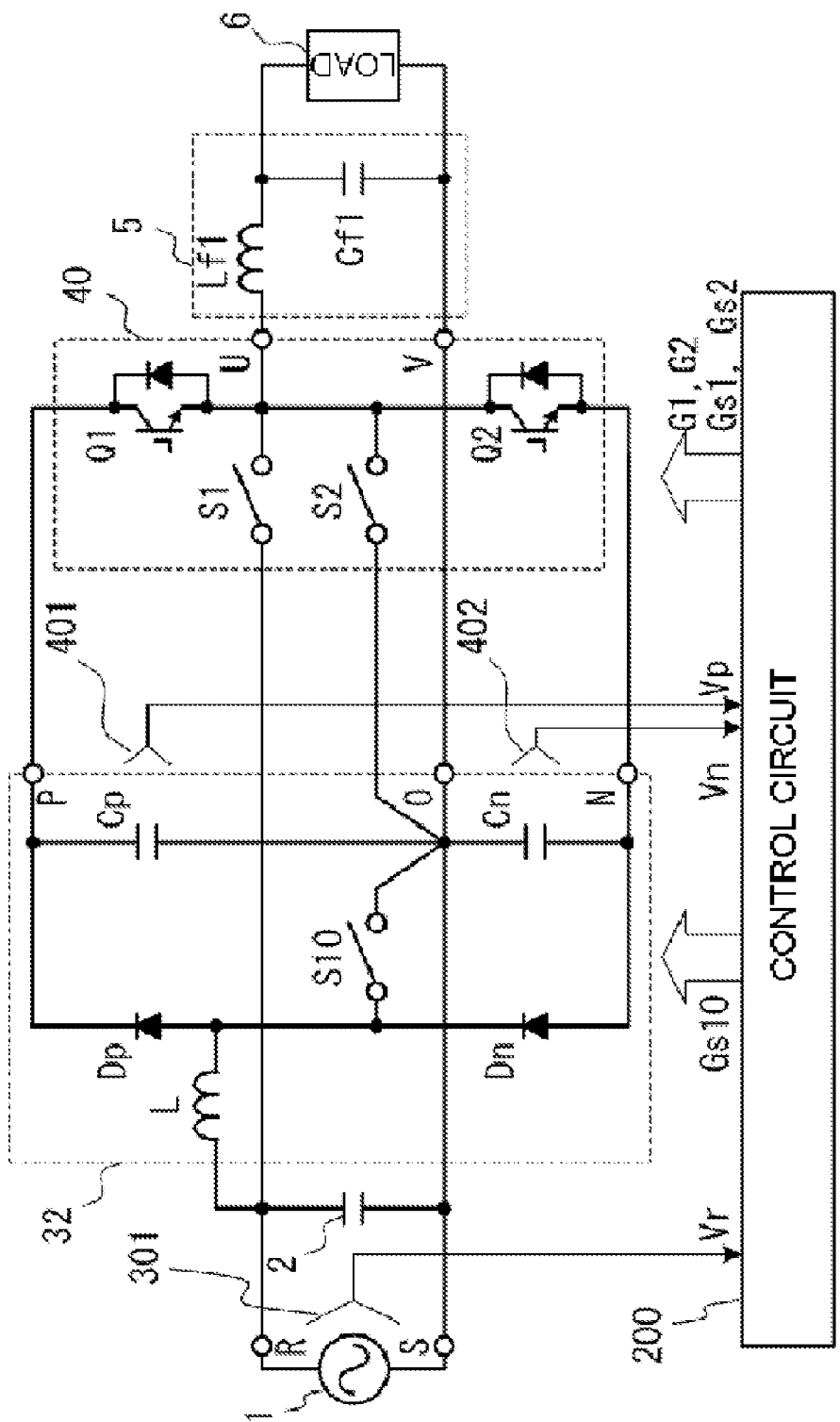
FIG. 15 is a diagram for illustrating a third embodiment of the invention.

FIG. 15 is a diagram for illustrating a third embodiment according to the invention. This embodiment is such that the direct current power source series circuit 30 according to the first embodiment shown in FIG. 1 is configured of a three-level rectifier 32.

The three-level rectifier 32 has as main components a series circuit of a positive side diode Dp and a negative side diode Dn, the series circuit of the positive side capacitor Cp and negative side capacitor Cn, a bidirectional switch element S10, and the reactor L. The reactor L is connected to the terminal R of the single phase alternating current power source 1 and a connection point of the diodes Dp and Dn. The series circuit of the capacitors Cp and Cn is connected in parallel to the series circuit of the diodes Dp and Dn. Also, a connection point of the capacitors Cp and Cn is connected to the terminal S of the single phase alternating current power source 1, and also connected to the alternating current output terminal V. Further, the bidirectional switch element S10 is connected between a connection point of the diodes Dp and Dn and the connection point of the capacitors Cp and Cn.

When the voltage of the single phase alternating current power source 1 is of positive polarity with respect to the alternating current output terminal V, firstly, the bidirectional switch element S10 is turned on. When the bidirectional switch element S10 is turned on, the voltage of the single phase alternating current power source 1 is applied to the reactor L, and energy is accumulated in the reactor L. Next, the bidirectional switch element S10 is turned off. On the bidirectional switch element S10 being turned off, the energy accumulated in the reactor L is charged in the capacitor Cp.

Meanwhile, when the voltage of the single phase alternating current power source 1 is of negative polarity with respect to the alternating current output terminal V, firstly, the bidirectional switch element S10 is turned on. When the bidirectional switch element S10 is turned on, the voltage of the single phase alternating current power source 1 is applied to the reactor L, and energy is accumulated in the reactor L. Next, the bidirectional switch element S10 is turned off. On the bidirectional switch element S10 being turned off, the energy accumulated in the reactor L is charged in the capacitor Cn.

The heretofore described turning on and off operations of the bidirectional switch element S10 are carried out at a frequency sufficiently higher than the frequency of the single phase alternating current power source 1. By the bidirectional switch element S10 being turned on and off, the positive voltage Vp of the capacitor Cp and the negative voltage Vn of the capacitor Cn are maintained at a predetermined voltage higher than the amplitude value of the voltage Vr of the single phase alternating current power source 1.

In this way, it is possible to configure the direct current power source series circuit 30 with the three-level rectifier 32. The capacitor Cp of the three-level rectifier 32 corresponds to the positive side direct current power source Psp of the direct current power source series circuit 30. Also, the capacitor Cn of the three-level rectifier 32 corresponds to the negative side direct current power source Psn of the direct current power source series circuit 30.

The inverter circuit 40 of this embodiment acts in the same way as the inverter circuit 40 of the first embodiment illustrated using FIG. 1 to FIG. 13, and the same advantages are obtained.

Figure 16:
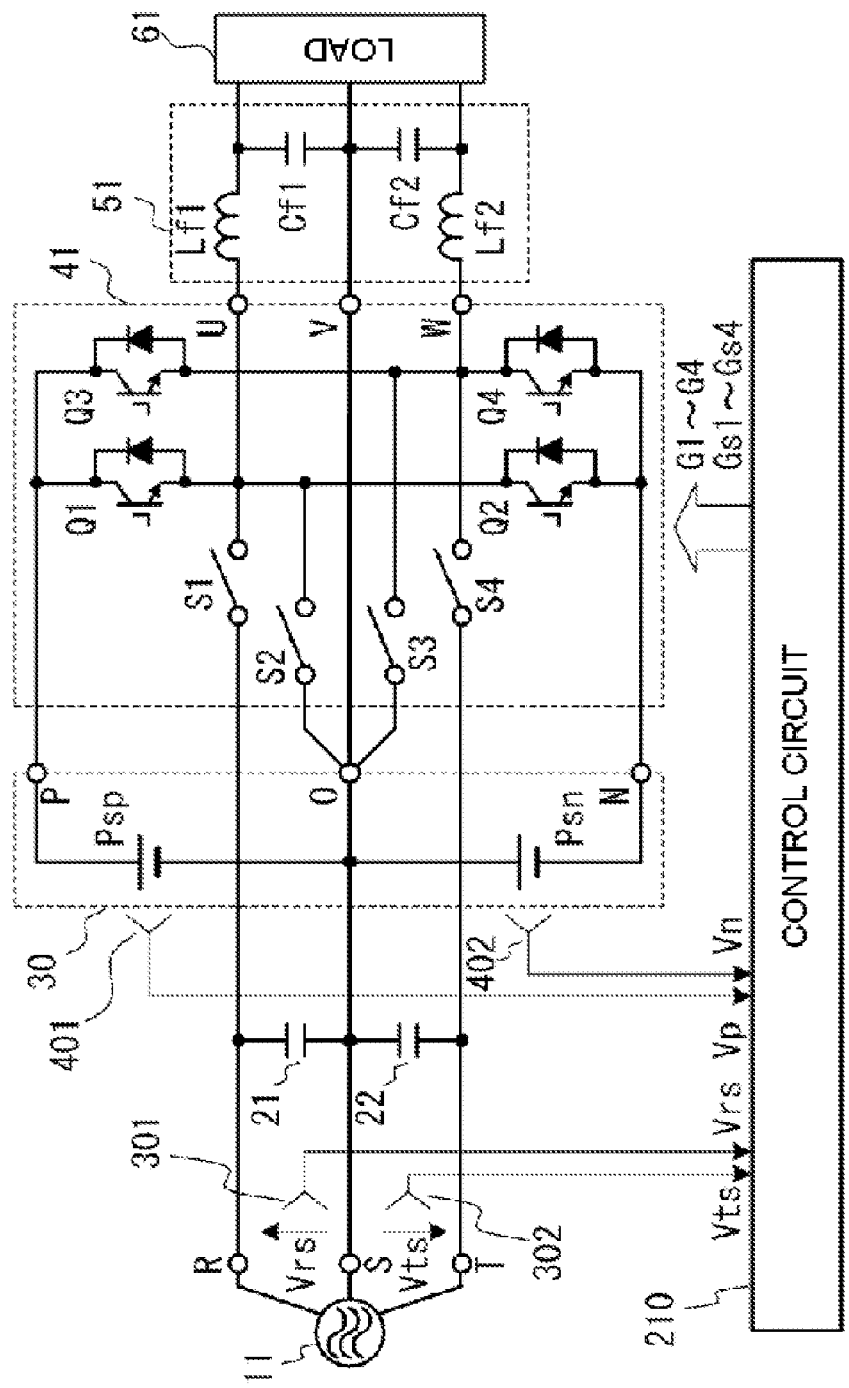
FIG. 16 is a diagram for illustrating a fourth embodiment of the invention.

FIG. 16 is a diagram for illustrating a fourth embodiment according to the invention. This embodiment is a power conversion device wherein a three-phase alternating current power source 11 and a load 61 are delta-connected using two of the inverter circuits according to the first embodiment shown in FIG. 1. The two inverter circuits generate a predetermined three-phase alternating current voltage using the voltage of the three-phase alternating current power source 11 and a direct current voltage generated from this voltage.

In the diagram, 11 is the three-phase alternating current power source, 21 and 22 are capacitors, 30 is the direct current power source series circuit, 41 is an inverter circuit, 51 is a filter circuit, 61 is the load, and 210 is a control circuit.

The three-phase alternating current power source 11 has a terminal R (a first terminal), a terminal S (a third terminal), and a terminal T (a second terminal). The terminal R outputs an R-phase voltage. The terminal S outputs an S-phase voltage. The terminal T outputs a T-phase voltage. The capacitor 21 is connected between the terminal R and terminal T. The capacitor 22 is connected between the terminal T and terminal S.

The direct current power source series circuit 30 is a direct current power source circuit formed of the direct current power source Psp and direct current power source Psn connected in series. The direct current power source Psp is a positive side direct current power source. The direct current power source Psn is a negative side direct current power source. One end of the direct current power source Psn is connected to the negative side terminal N that outputs voltage with negative polarity. A series connection point of the direct current power source Psp and direct current power source Psn is connected to the neutral terminal O that outputs a null voltage. The neutral terminal O is connected to the terminal S of the three-phase alternating current power source 11.

The inverter circuit 41 has a first switching element series circuit, a second switching element series circuit, and bidirectional switch elements S1 to S4 as main components.

The first switching element series circuit is a circuit formed of the switching element Q1 and switching element Q2 connected in series. The second switching element series circuit is a circuit formed of a switching element Q3 and a switching element Q4 connected in series. The first switching element series circuit and second switching element series circuit are connected between the positive side terminal P and negative side terminal N of the direct current power source series circuit 30.

A series connection point of the switching element Q1 and switching element Q2 is connected to the alternating current output terminal U for outputting a U-phase voltage from the inverter circuit 41. A series connection point of the switching element Q3 and switching element Q4 is connected to an alternating current output terminal W for outputting a W-phase voltage from the inverter circuit 41. Further, the neutral terminal O of the direct current power source series circuit 30 is connected to the alternating current output terminal V for outputting a V-phase voltage from the inverter circuit 41.

The bidirectional switch element S1 is connected between the alternating current output terminal U and the terminal R of the three-phase alternating current power source 11. The bidirectional switch element S2 is connected between the alternating current output terminal U and the neutral terminal O of the direct current power source series circuit 30. The bidirectional switch element S3 is connected between the alternating current output terminal W and the neutral terminal O of the direct current power source series circuit 30. The bidirectional switch element S4 is connected between the alternating current output terminal W and the terminal T of the three-phase alternating current power source 11.

That is, the inverter circuit 41 is formed of a U-phase inverter circuit, formed of the first switching element series circuit and bidirectional switch elements S1 and S2, and a W-phase inverter circuit, formed of the second switching element series circuit and bidirectional switch elements S3 and S4. Further, the U-phase inverter circuit and W-phase inverter circuit delta-connect the three-phase alternating current power source 11 and load 61.

The control circuit 210 includes two control circuits 211 and 212 (neither shown) corresponding to the control circuit 200 shown in FIG. 3. The control circuit 211, using voltage included in a first voltage group, generates the control signals G1, G2, Gs1, and Gs2 of the switching elements Q1 and Q2 and bidirectional switch elements S1 and S2 configuring the U-phase inverter circuit. The control circuit 212, using voltage included in a second voltage group, generates control signals G3, G4, Gs3, and Gs4 of the switching elements Q3 and Q4 and bidirectional switch elements S3 and S4 configuring the W-phase inverter circuit. The first voltage group is a voltage group formed of four levels of voltage, those being a null voltage having the potential of the neutral terminal O as a reference, the positive voltage Vp and negative voltage Vn of the direct current power source series circuit 30, and a voltage Vrs of the three-phase alternating current power source 11. The second voltage group is a voltage group formed of four levels of voltage, those being a null voltage having the potential of the neutral terminal O as a reference, the positive voltage Vp and negative voltage Vn of the direct current power source series circuit 30, and a voltage Vts of the three-phase alternating current power source 11.

Operations of the control circuits 211 and 212 are each the same as that of the control circuit 200. Consequently, a description of the operations of the control circuits 211 and 212 will be omitted.

The inverter circuit 41 of this embodiment acts in the same way as the inverter circuit 40 of the first embodiment illustrated using FIG. 1 to FIG. 13, and the same advantages are obtained.

That is, the inverter circuit 41 is such that operations turning on and off the switching elements Q1 and Q2 and bidirectional switch elements S1 and S2 in the steady-state mode are carried out between a first voltage and second voltage selected from the first voltage group. Also, operations turning on and off the switching elements Q3 and Q4 and bidirectional switch elements S3 and S4 in the steady-state mode are carried out between a first voltage and second voltage selected from the second voltage group. Further, as is also clear from FIG. 5 to FIG. 10, the difference between each first voltage and second voltage is small in comparison with the size of the positive voltage Vp and negative voltage Vn of the direct current power source series circuit 30.

Consequently, switching loss occurring when the switching elements Q1 to Q4 are turned on and turned off is smaller than the switching loss occurring in the switching elements of the inverter circuit 4 shown in FIG. 18. In the same way, switching loss occurring when the bidirectional switch elements S1 to S4 are turned on and turned off is smaller than the switching loss occurring in the switching elements of the inverter circuit 4 shown in FIG. 18.

That is, when the control frequency of the inverter circuit 41 is the same as the control frequency of the inverter circuit 4, switching loss in the inverter circuit 41 can be reduced in comparison with when configuring using the inverter circuit 4 of FIG. 18.

In particular, it is preferable that alternating current output voltages Vuv and Vwv are synchronized with the voltages Vrs and Vts of the three-phase alternating current power source 11. By synchronizing the alternating current output voltages Vuv and Vwv with the voltages Vrs and Vts of the three-phase alternating current power source 11, it is possible to reduce the voltage applied to the switching elements Q1 to Q4 and bidirectional switch elements S1 to S4. As a result of this, it is possible to further reduce switching loss occurring in these elements.

Also, the alternating current output voltages Vuv and Vwv each change between the first voltage and second voltage. Consequently, the voltage applied to reactors Lf1 and Lf2 decreases. As a result of this, ripple current flowing through the reactors Lf1 and Lf2 decreases, and loss (mainly iron loss) in the reactors Lf1 and Lf2 decreases. Consequently, it is possible to reduce loss in the reactors Lf1 and Lf2.

Meanwhile, when arranging so that the ripple currents are the same, it is possible to reduce the inductance value of the reactors Lf1 and Lf2. In this case, it is possible to reduce the size of the reactors Lf1 and Lf2.

Also, even in the event that an interruption of the three-phase alternating current power source 11 occurs, the inverter circuit 41 does not need means for detecting an interruption of the three-phase alternating current power source 11 when controlling in order to output the alternating current output voltages Vuv and Vwv.

Also, the inverter circuit 41 causes the bidirectional switch elements S1 and S2 and bidirectional switch elements S3 and S4 to be turned on and off in a complementary way in each control period in the start-up mode. At this time, the inverter circuit 41 carries out a so-called soft start operation whereby the on-state time of the bidirectional switch element S1 and the on-state time of the bidirectional switch element S4 are gradually increased, and the on-state time of the bidirectional switch element S2 and the on-state time of the bidirectional switch element S3 are gradually decreased, with the passing of time.

Owing to this operation, the voltages applied to the bidirectional switch elements S1 to S4 in the start-up mode are the voltages Vrs and Vts of the three-phase alternating current power source 11. Consequently, the inverter circuit 41 of the embodiment is such that it is possible to reduce turn-on loss and turn-off loss occurring in the bidirectional switch elements in the start-up mode. In the start-up mode, loss occurring in the switching elements is zero.

Also, the variation range of the voltage Vuv output between the alternating current output terminals U and V and the variation range of the voltage Vwv output between the alternating current output terminals W and V in each control period in the start-up mode are the sizes of the voltages Vrs and Vts of the three-phase alternating current power source 11. Consequently, the inverter circuit 41 of the embodiment is such that it is possible to reduce the ripple current flowing through the filter circuit 51 in the start-up mode.

Figure 17:
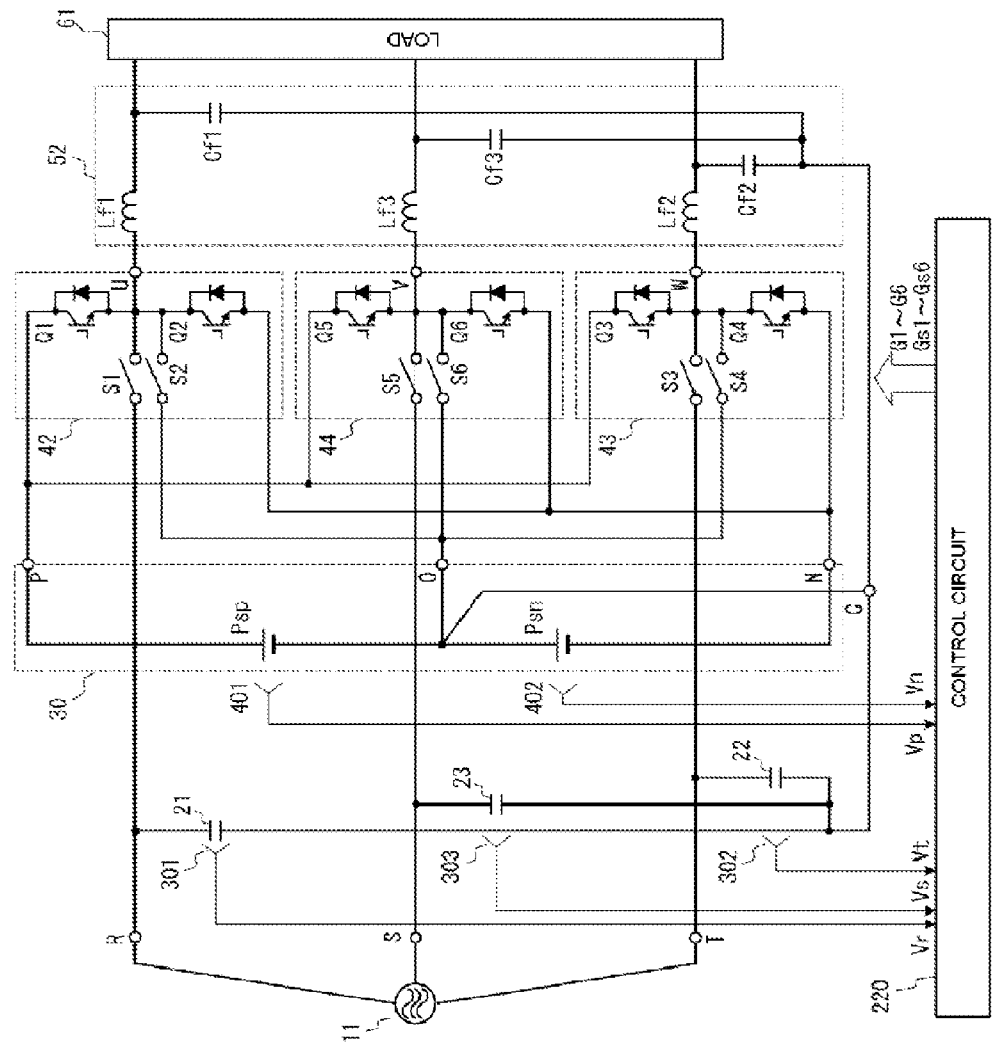
FIG. 17 is a diagram for illustrating a fifth embodiment of the invention.

FIG. 17 is a diagram for illustrating a fifth embodiment according to the invention. This embodiment is a power conversion device wherein the three-phase alternating current power source 11 and load 61 are Y-connected using three of the inverter circuits according to the first embodiment shown in FIG. 1. The three inverter circuits generate a predetermined three-phase alternating current voltage using the voltage of the three-phase alternating current power source 11 and a direct current voltage generated from this voltage.

A description will be omitted of components in the diagram given the same reference signs as in FIG. 16.

42 is a U-phase inverter circuit, 43 is a W-phase inverter circuit, and 44 is a V-phase inverter circuit. The U-phase inverter circuit 42 has a first switching element series circuit and the bidirectional switch elements S1 and S2 as main components. The W-phase inverter circuit 43 has a second switching element series circuit and the bidirectional switch elements S3 and S4 as main components. The V-phase inverter circuit 44 has a third switching element series circuit and bidirectional switch elements S5 and S6 as main components.

The first switching element series circuit is a circuit formed of the switching element Q1 and switching element Q2 connected in series. The first switching element series circuit is connected between the positive side terminal P and negative side terminal N of the direct current power source series circuit 30. A series connection point of the switching element Q1 and switching element Q2 is connected to the alternating current output terminal U for outputting a U-phase voltage from the inverter circuit 42. The bidirectional switch element S1 is connected between the alternating current output terminal U and the terminal R of the three-phase alternating current power source 11. The bidirectional switch element S2 is connected between the alternating current output terminal U and the neutral terminal O of the direct current power source series circuit 30.

The second switching element series circuit is a circuit formed of the switching element Q3 and switching element Q4 connected in series. The second switching element series circuit is connected between the positive side terminal P and negative side terminal N of the direct current power source series circuit 30. A series connection point of the switching element Q3 and switching element Q4 is connected to the alternating current output terminal W for outputting a W-phase voltage from the inverter circuit 43. The bidirectional switch element S3 is connected between the alternating current output terminal W and the terminal T of the three-phase alternating current power source 11. The bidirectional switch element S4 is connected between the alternating current output terminal W and the neutral terminal O of the direct current power source series circuit 30.

The third switching element series circuit is a circuit formed of the switching element Q5 and switching element Q6 connected in series. The third switching element series circuit is connected between the positive side terminal P and negative side terminal N of the direct current power source series circuit 30. A series connection point of the switching element Q5 and switching element Q6 is connected to the alternating current output terminal V for outputting a V-phase voltage from the inverter circuit 44. The bidirectional switch element S5 is connected between the alternating current output terminal V and the terminal S of the three-phase alternating current power source 11. The bidirectional switch element S6 is connected between the alternating current output terminal V and the neutral terminal O of the direct current power source series circuit 30.

That is, the U-phase inverter circuit 42, W-phase inverter circuit 43, and V-phase inverter circuit 44 Y-connect the three-phase alternating current power source 11 and load 61.

Capacitors 21 to 23 are Y-connected, and one end of each thereof is connected to the terminals R, T, and S respectively of the three-phase alternating current power source 11. A neutral terminal of the Y-connected capacitors 21 to 23 is connected to the neutral terminal O of the direct current power source series circuit 30.

A filter circuit 52 is formed by Y-connecting a series circuit of the reactor Lf1 and capacitor Cf1, a series circuit of the reactor Lf2 and a capacitor Cf2, and a series circuit of a reactor Lf3 and a capacitor Cf3. A neutral terminal of the Y-connected filter circuit 52 is connected to the neutral terminal O of the direct current power source series circuit 30.

The control circuit 220 includes three control circuits 211, 212, and 213 (none shown) corresponding to the control circuit 200 shown in FIG. 3. The control circuit 211, using voltage included in a first voltage group, generates the control signals G1, G2, Gs1, and Gs2 of the switching elements Q1 and Q2 and bidirectional switch elements S1 and S2 configuring the U-phase inverter circuit. The control circuit 212, using voltage included in a second voltage group, generates control signals G3, G4, Gs3, and Gs4 of the switching elements Q3 and Q4 and bidirectional switch elements S3 and S4 configuring the W-phase inverter circuit. The control circuit 213, using voltage included in a third voltage group, generates control signals G5, G6, Gs5, and Gs6 of the switching elements Q5 and Q6 and bidirectional switch elements S5 and S6 configuring the V-phase inverter circuit.

The first voltage group is a voltage group formed of four levels of voltage, those being a null voltage having the potential of the neutral terminal O as a reference, the positive voltage Vp and negative voltage Vn of the direct current power source series circuit 30, and a voltage Vr of the three-phase alternating current power source 11. The second voltage group is a voltage group formed of four levels of voltage, those being a null voltage having the potential of the neutral terminal O as a reference, the positive voltage Vp and negative voltage Vn of the direct current power source series circuit 30, and a voltage Vt of the three-phase alternating current power source 11. The third voltage group is a voltage group formed of four levels of voltage, those being a null voltage having the potential of the neutral terminal O as a reference, the positive voltage Vp and negative voltage Vn of the direct current power source series circuit 30, and a voltage Vs of the three-phase alternating current power source 11.

Operations of the control circuits 211, 212, and 213 are each the same as that of the control circuit 200. Consequently, a description of the operations of the control circuits 211, 212, and 213 will be omitted.

The inverter circuits 42 to 44 of this embodiment act in the same way as the inverter circuit 40 of the first embodiment illustrated using FIG. 1 to FIG. 13, and the same advantages are obtained.

That is, operations turning on and off the switching elements and bidirectional switch elements of the U-phase inverter circuit 42 in the steady-state mode are carried out between a first voltage and second voltage selected from the first voltage group. Also, operations turning on and off the switching elements and bidirectional switch elements of the W-phase inverter circuit 43 in the steady-state mode are carried out between a first voltage and second voltage selected from the second voltage group. Also, operations turning on and off the switching elements and bidirectional switch elements of the V-phase inverter circuit 44 in the steady-state mode are carried out between a first voltage and second voltage selected from the third voltage group. Further, as is also clear from FIG. 5 to FIG. 10, the difference between each first voltage and second voltage is small in comparison with the size of the positive voltage Vp and negative voltage Vn of the direct current power source series circuit 30.

Consequently, switching loss occurring when the switching elements Q1 to Q6 are turned on and turned off is smaller than the switching loss occurring in the switching elements of the inverter circuit 4 shown in FIG. 18. In the same way, switching loss occurring when the bidirectional switch elements S1 to S6 are turned on and turned off is smaller than the switching loss occurring in the switching elements of the inverter circuit 4 shown in FIG. 18.

That is, when the control frequency of the inverter circuits 42 to 44 is the same as the control frequency of the inverter circuit 4, switching loss in the inverter circuits 42 to 44 can be reduced in comparison with when configuring using the inverter circuit 4 of FIG. 18.

In particular, it is preferable that alternating current output voltages Vu, Vw, and Vv are synchronized with the voltages Vr, Vt, and Vs respectively of the three-phase alternating current power source 11. By synchronizing the alternating current output voltages Vu, Vw, and Vv with the voltages Vr, Vt, and Vs of the three-phase alternating current power source 11, it is possible to reduce the voltage applied to the switching elements Q1 to Q6 and bidirectional switch elements S1 to S6. As a result of this, it is possible to further reduce switching loss occurring in these elements.

Also, the alternating current output voltages Vu, Vw, and Vv each change between the first voltage and second voltage. Consequently, the voltage applied to the reactors Lf1, Lf2, and Lf3 decreases. As a result of this, ripple current flowing through the reactors Lf1, Lf2, and Lf3 decreases, and loss (mainly iron loss) in the reactors Lf1, Lf2, and Lf3 decreases. Consequently, it is possible to reduce loss in the reactors Lf1, Lf2, and Lf3.

Meanwhile, when arranging so that the ripple currents are the same, it is possible to reduce the inductance value of the reactors Lf1, Lf2, and Lf3. In this case, it is possible to reduce the size of the reactors Lf1, Lf2, and Lf3.

Also, even in the event that an interruption of the three-phase alternating current power source 11 occurs, the inverter circuits 42 to 44 do not need means for detecting an interruption of the three-phase alternating current power source 11 when controlling in order to output the alternating current output voltages Vu, Vw, and Vv.

Also, the inverter circuits 42 to 44 cause the bidirectional switch elements S1 and S2, bidirectional switch elements S3 and S4, and bidirectional switch elements S5 and S6 to be turned on and off in a complementary way in each control period in the start-up mode. At this time, the inverter circuits 42 to 44 carry out a so-called soft start operation whereby the on-state time of the bidirectional switch element S1, the on-state time of the bidirectional switch element S3, and the on-state time of the bidirectional switch element S5 are gradually increased, and the on-state time of the bidirectional switch element S2, the on-state time of the bidirectional switch element S4, and the on-state time of the bidirectional switch element S6 are gradually decreased, with the passing of time.

Owing to this operation, the voltages applied to the bidirectional switch elements S1 to S6 in the start-up mode are the voltages Vr, Vt, and Vs of the three-phase alternating current power source 11. Consequently, the inverter circuits 42 to 44 of the embodiment are such that it is possible to reduce turn-on loss and turn-off loss occurring in the bidirectional switch elements in the start-up mode. In the start-up mode, loss occurring in the switching elements is zero.

Also, the variation range of the voltage Vu output between the alternating current output terminals U and O, the variation range of the voltage Vw output between the alternating current output terminals W and O, and the variation range of the voltage Vv output between the alternating current output terminals V and O in each control period in the start-up mode are the sizes of the voltages Vr, Vt, and Vs of the three-phase alternating current power source 11. Consequently, the inverter circuits 42 to 44 of the embodiment are such that it is possible to reduce the ripple current flowing through the filter circuit 52 in the start-up mode.

The invention claimed is:

1. An inverter circuit comprising:
a first direct current power source having a positive voltage and a second direct current power source having a negative voltage, connected together in series via a connection point, the connection point being a neutral terminal,
a single phase alternating current power source having an alternating current source voltage, one end of the single phase alternating current power source being connected to the neutral terminal,
a first alternating current output terminal and a second alternating current output terminal, the second alternating current output terminal connected to the neutral terminal,
the inverter circuit having as input four levels of voltage, being a null voltage having a potential of the neutral terminal, the positive voltage, the negative voltage, and the alternating current source voltage wherein:
in a steady-state mode, supplying a predetermined voltage to a load as an alternating current output voltage, first and second voltages selected from among the four levels of voltage are output in a complementary way between the first alternating current output terminal and the second alternating current output terminal in each of control periods synchronous and asynchronous with a cycle of the alternating current output voltage; and in a start-up mode, raising the alternating current output voltage from zero to the predetermined voltage, taking, of the four levels of voltage, the alternating current source voltage as the first voltage and the null voltage as the second voltage, the first and second voltages being output in a complementary way between the first alternating current output terminal and the second alternating current output terminal in each of the control periods.

2. The inverter circuit according to claim 1, wherein the alternating current output voltage in the start-up mode is a voltage synchronous with the alternating current source voltage, and is output based on an alternating current voltage command that rises from zero to a set voltage with the passing of time.

3. The inverter circuit according to claim 2, wherein a time for which the alternating current source voltage is output in each control period in the start-up mode is based upon a ratio of the alternating current voltage command to the alternating current source voltage.

4. The inverter circuit according to claim 3 including:

a switching element series circuit formed by a positive side switching element connected to a positive side terminal of the first direct current power source and a negative side switching element connected to a negative side terminal of the second direct current power source being connected in series, a series connection point thereof being connected to the first alternating current output terminal;

a first bidirectional switch element connected between the first alternating current output terminal and a first terminal of the alternating current power source; and a second bidirectional switch element connected between the first alternating current output terminal and the neutral terminal, wherein the first and second bidirectional switch elements are turned on and off in a complementary way in each control period in the start-up mode.

5. The inverter circuit according to claim 4, wherein after a deviation between the alternating current source voltage and a fundamental wavelength element of the alternating current output voltage comes within a preset range in the start-up mode, the operation of the inverter circuit shifts from the start-up mode to the steady-state mode.

6. A three-phase inverter circuit including two of the inverter circuits according to claim 5, wherein a three-phase alternating current power source and a three-phase load are delta-connected using the two inverter circuits.

7. A three-phase inverter circuit including three of the inverter circuits according to claim 5, wherein a three-phase alternating current power source and a three-phase load are Y-connected using the three inverter circuits.

8. The inverter circuit according to claim 2, wherein an average value of voltage output to the first alternating current output terminal in each control period in the start-up mode is equivalent to an average value of the alternating current voltage command.

9. The inverter circuit according to claim 8 including:

a switching element series circuit formed by a positive side switching element connected to a positive side terminal of the first direct current power source and a negative side switching element connected to a negative side terminal of the second direct current power source being connected in series, a series connection point thereof being connected to the first alternating current output terminal;

a first bidirectional switch element connected between the first alternating current output terminal and a first terminal of the alternating current power source; and a second bidirectional switch element connected between the first alternating current output terminal and the neutral terminal, wherein the first and second bidirectional switch elements are turned on and off in a complementary way in each control period in the start-up mode.

10. The inverter circuit according to claim 9, wherein after a deviation between the alternating current source voltage and a fundamental wavelength element of the alternating current output voltage comes within a preset range in the start-up mode, the operation of the inverter circuit shifts from the start-up mode to the steady-state mode.

11. A three-phase inverter circuit including two of the inverter circuits according to claim 10, wherein a three-phase alternating current power source and a three-phase load are delta-connected using the two inverter circuits.

12. A three-phase inverter circuit including three of the inverter circuits according to claim 10, wherein a three-phase alternating current power source and a three-phase load are Y-connected using the three inverter circuits.

13. The inverter circuit according to claim 2 including:

a switching element series circuit formed by a positive side switching element connected to a positive side terminal of the first direct current power source and a negative side switching element connected to a negative side terminal of the second direct current power source being connected in series, a series connection point thereof being connected to the first alternating current output terminal;

a first bidirectional switch element connected between the first alternating current output terminal and a first terminal of the alternating current power source; and a second bidirectional switch element connected between the first alternating current output terminal and the neutral terminal, wherein the first and second bidirectional switch elements are turned on and off in a complementary way in each control period in the start-up mode.

14. The inverter circuit according to claim 13, wherein after a deviation between the alternating current source voltage and a fundamental wavelength element of the alternating current output voltage comes within a preset range in the start-up mode, the operation of the inverter circuit shifts from the start-up mode to the steady-state mode.

15. A three-phase inverter circuit including two of the inverter circuits according to claim 14, wherein a three-phase alternating current power source and a three-phase load are delta-connected using the two inverter circuits.

16. A three-phase inverter circuit including three of the inverter circuits according to claim 14, wherein a three-phase alternating current power source and a three-phase load are Y-connected using the three inverter circuits.

17. The inverter circuit according to claim 1 including:

a switching element series circuit formed by a positive side switching element connected to a positive side terminal of the first direct current power source and a negative side switching element connected to a negative side terminal of the second direct current power source being connected in series, a series connection point thereof being connected to the first alternating current output terminal;

a first bidirectional switch element connected between the first alternating current output terminal and a first terminal of the alternating current power source; and a second bidirectional switch element connected between the first alternating current output terminal and the neutral terminal, wherein the first and second bidirectional switch elements are turned on and off in a complementary way in each control period in the start-up mode.

18. The inverter circuit according to claim 17, wherein after a deviation between the alternating current source voltage and a fundamental wavelength element of the alternating current output voltage comes within a preset range in the start-up mode, the operation of the inverter circuit shifts from the start-up mode to the steady-state mode.

19. A three-phase inverter circuit including two of the inverter circuits according to claim 18, wherein a three-phase alternating current power source and a three-phase load are delta-connected using the two inverter circuits.

20. A three-phase inverter circuit including three of the inverter circuits according to claim 18, wherein a three-phase alternating current power source and a three-phase load are Y-connected using the three inverter circuits.

* * * * *